United States Patent
Kojo et al.

(10) Patent No.: US 11,884,322 B2
(45) Date of Patent: Jan. 30, 2024

(54) DRIVE ASSIST APPARATUS

(71) Applicant: SUBARU CORPORATION, Tokyo (JP)

(72) Inventors: Hiroshi Kojo, Tokyo (JP); Yuki Aoyama, Tokyo (JP); Shinji Saito, Tokyo (JP); Takashi Omikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 173 days.

(21) Appl. No.: 17/493,665

(22) Filed: Oct. 4, 2021

(65) Prior Publication Data

US 2022/0105984 A1 Apr. 7, 2022

(30) Foreign Application Priority Data

Oct. 2, 2020 (JP) .............................. 2020-168085

(51) Int. Cl.
*B62D 15/02* (2006.01)
*B60W 10/20* (2006.01)
*B60W 30/12* (2020.01)

(52) U.S. Cl.
CPC ......... *B62D 15/0265* (2013.01); *B60W 10/20* (2013.01); *B60W 30/12* (2013.01);
(Continued)

(58) Field of Classification Search
CPC ... B62D 15/0265; B60W 10/20; B60W 30/12; B60W 2540/26; B60W 2554/408; B60W 2710/202
See application file for complete search history.

(56) References Cited

U.S. PATENT DOCUMENTS 11,498,618 B2 * 11/2022 Aoyama .................. B62D 6/10
2005/0240328 A1 * 10/2005 Shirato .................. B62D 1/286
701/1
(Continued)

FOREIGN PATENT DOCUMENTS

JP 2019-26210 A 2/2019
JP 2019-156327 A 9/2019
JP 2020-32802 A 3/2020

*Primary Examiner* — Jelani A Smith
*Assistant Examiner* — Nada Mahyoob Alqaderi
(74) *Attorney, Agent, or Firm* — TROUTMAN PEPPER HAMILTON SANDERS LLP

(57) ABSTRACT

A drive assist apparatus includes a surrounding situation recognition device, a surrounding situation determination processor, a steering-wheel holding state recognizer, a steering-wheel holding state determination processor, and a traveling control device. The surrounding situation recognition device recognizes a surrounding situation of a first vehicle to be applied with the apparatus. The surrounding situation determination processor determines the surrounding situation based on a recognition result of the surrounding situation recognition device. The steering-wheel holding state recognizer recognizes a steering-wheel holding state. The steering-wheel holding state determination processor determines the steering-wheel holding state on the basis of a recognition result of the steering-wheel holding state recognizer. The traveling control device executes a traveling control for emergency in a case where the surrounding situation determination processor or the steering-wheel holding state determination processor determines that the first vehicle or a driver of the first vehicle is unable to maintain normal traveling.

3 Claims, 11 Drawing Sheets

(52) U.S. Cl.
CPC ... *B60W 2540/223* (2020.02); *B60W 2540/26* (2013.01); *B60W 2554/408* (2020.02); *B60W 2710/202* (2013.01)

(56) References Cited

U.S. PATENT DOCUMENTS

| | | | |
|---|---|---|---|
| 2014/0172235 A1* | 6/2014 | Werling | B60W 30/12 701/41 |
| 2016/0033964 A1* | 2/2016 | Sato | B60K 28/06 701/24 |
| 2016/0338632 A1* | 11/2016 | Yan | B60W 50/14 |
| 2019/0283748 A1* | 9/2019 | Hajika | G06V 20/588 |
| 2019/0300014 A1* | 10/2019 | Nagase | B60K 37/06 |
| 2020/0023860 A1* | 1/2020 | Lee | B60W 50/045 |
| 2020/0023884 A1* | 1/2020 | Mizoo | B60W 30/16 |
| 2020/0070826 A1* | 3/2020 | Watanabe | G08G 1/166 |
| 2020/0262452 A1* | 8/2020 | Nagashima | G08G 1/207 |

\* cited by examiner

DRIVE ASSIST APPARATUS

CROSS-REFERENCE TO RELATED APPLICATION

The present application claims priority from Japanese Patent Application No. 2020-168085 filed on Oct. 2, 2020, the entire contents of which are hereby incorporated by reference.

BACKGROUND

The technology relates to a drive assist apparatus that performs various steering assist controls including an emergency lane keeping control and also performs a control for driver abnormality. The emergency lane keeping control may be a control of assisting a steering operation in order to allow a vehicle to avoid a hazard to encounter while traveling. Non-limiting examples of the vehicle may include an automobile. The control for driver abnormality may be executed while the vehicle is traveling.

For vehicles such as automobiles, an automatic driving control technique of causing a vehicle to travel automatically without requiring a driver's driving operation has been recently developed. In addition, various propositions have been made recently regarding a drive assist apparatus configured to perform various controls using this automatic driving control technique to assist the driver's driving operation. Such a drive assist apparatus has been also generally put into practical use recently.

For example, in a case where it is predicted that an own vehicle is to encounter a hazard, the drive assist apparatus executes various steering assist controls to assist a steering operation that allows for the own vehicle to avoid the hazard. Non-limiting examples of the hazard may include a contact between the traveling own vehicle and another vehicle such as an opposing vehicle or a subsequent vehicle.

As an example of the steering assist control to be executed by the drive assist apparatus, Japanese Unexamined Patent Application Publication No. 2020-32802 proposes the following lane keep assist control. In this control, for example, in a case where a vehicle provided with the drive assist apparatus is traveling on a road, the drive assist apparatus sets a predetermined position on a traveling lane on which the own vehicle is traveling as a target traveling position. The predetermined position may be a position at the middle of the lane, for example. Upon performing a traveling control of the own vehicle to cause the own vehicle to travel along the set target traveling position, the drive assist apparatus assists steering with use of assist steering torque generated by a device such as an electric motor, for example.

As another example of the steering assist control to be performed by the drive assist apparatus, Japanese Unexamined Patent Application Publication No. 2019-156327 proposes the following lane departure prevention (LDP) control. In this control, for example, in a case where a vehicle provided with the drive assist apparatus is to depart from a traveling lane on which the vehicle is traveling into an adjacent lane, the drive assist apparatus assists steering in a direction that allows the vehicle to avoid departure from the traveling lane, thereby preventing the vehicle from departing from the traveling lane.

In addition, various propositions have been recently made regarding an emergency lane keeping (ELK) control. For example, assume a case where a vehicle provided with the drive assist apparatus is to depart from a traveling lane on which the vehicle is traveling into an adjacent lane, and where another vehicle is detected. The other vehicle may be, for example, an opposing vehicle or a subsequent vehicle traveling on the adjacent lane. In this control, in such a case, the drive assist apparatus performs a warning presentation indicating the detection of the other vehicle. The warning presentation may be a visual warning, an audio warning, or any other kind of warning. At the same time, the drive assist apparatus executes a traveling control with steering assistance substantially similar to the above-described lane departure prevention control. The drive assist apparatus thereby avoids a contact between the own vehicle and the other vehicle such as the opposing vehicle or the subsequent vehicle.

Further, the drive assist apparatus is configured to allow a driver to select ON or OFF of the respective various steering assist controls described above including the lane keep assist control, the lane departure prevention control, and the emergency lane keeping control independently of each other and to select whether to activate each of the steering assist controls.

In general, the drive assist apparatus is configured to detect that the driver is holding a steering wheel while the vehicle is traveling, for example. That is, the drive assist apparatus is configured to perform so-called steering-wheel holding state determination operation.

The drive assist apparatus performs the steering-wheel holding state determination operation to monitor a state in which the driver is holding the steering wheel while the vehicle is traveling. The state in which the driver is holding the steering wheel is hereinafter referred to as a "steering-wheel holding state". In a case where a situation with no detection of the steering-wheel holding state continues for a predetermined time period (e.g., 15 seconds) or while the own vehicle travels a predetermined distance, the drive assist apparatus performs a predetermined warning presentation. The predetermined warning display is, for example, a visual warning presentation, an audio warning presentation, or any other kind of warning presentation. Thereafter, in a case where a state in which the driver's hand is away from the steering wheel continues for a predetermined time period (e.g., 50 seconds) or while the own vehicle travels a predetermined distance, the drive assist apparatus cancels the steering assist control which is currently being executed. This is achieved, for example, by specifications conforming to international standards for automatic driving, guidelines established by national authorities concerned, etc.

In addition, regarding the drive assist apparatus, various propositions have been made for the drive assist control as follows. In a case where the steering assist control which is currently being executed is canceled in the above-described situation, for example, the drive assist apparatus determines that some kind of abnormality is occurring which makes it difficult for the driver to perform the driving operation. Non-limiting examples of the abnormality include malfunction of the own vehicle, and a decrease in driver's consciousness caused by a sudden sickness or dozing of the driver. In such a case, the drive assist apparatus executes a so-called control for driver abnormality. For example, Japanese Unexamined Patent Application Publication No. 2019-26210 proposes such a technique.

SUMMARY

An aspect of the technology provides a drive assist apparatus to be applied to a vehicle. The drive assist apparatus includes a surrounding situation recognition device, a surrounding situation determination processor, a steering-wheel holding state recognizer, a steering-wheel holding state determination processor, and a traveling control device. The surrounding situation recognition device is configured to recognize a surrounding situation of a first vehicle that is the vehicle to be applied with the drive assist apparatus. The surrounding situation determination processor is configured to determine the surrounding situation of the first vehicle on the basis of a result of recognition performed by the surrounding situation recognition device. The steering-wheel holding state recognizer is configured to recognize a steering-wheel holding state that is a state in which a driver who drives the first vehicle is holding a steering wheel of the first vehicle. The steering-wheel holding state determination processor is configured to determine the steering-wheel holding state on the basis of a result of recognition performed by the steering-wheel holding state recognizer. The traveling control device is configured to perform a traveling control of the first vehicle on the basis of a result of determination performed by the surrounding situation determination processor or the steering-wheel holding state determination processor. The traveling control device is configured to execute a traveling control for emergency in a case where the result of the determination performed by the surrounding situation determination processor or the steering-wheel holding state determination processor indicates that the first vehicle or the driver of the first vehicle is unable to maintain normal traveling.

An aspect of the technology provides a drive assist apparatus to be applied to a vehicle. The drive assist apparatus includes a surrounding situation sensor, a steering-wheel holding state sensor, and circuitry. The surrounding situation sensor is configured to recognize a surrounding situation of a first vehicle that is the vehicle to be applied with the drive assist apparatus. The steering-wheel holding state sensor is configured to recognize a steering-wheel holding state that is a state in which a driver who drives the first vehicle is holding a steering wheel of the first vehicle. The circuitry is configured to determine the surrounding situation of the first vehicle on the basis of a result of recognition performed by the surrounding situation sensor. The circuitry is configured to determine the steering-wheel holding state on the basis of a result of recognition performed by the steering-wheel holding state sensor. The circuitry is configured to perform a traveling control of the first vehicle on the basis of a result of determination of the surrounding situation or a result of determination of the steering-wheel holding state. The circuitry is configured to execute a traveling control for emergency in a case where the result of the determination of the surrounding situation or the result of the determination of the steering-wheel holding state indicates that the first vehicle or the driver of the first vehicle is unable to maintain normal traveling.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
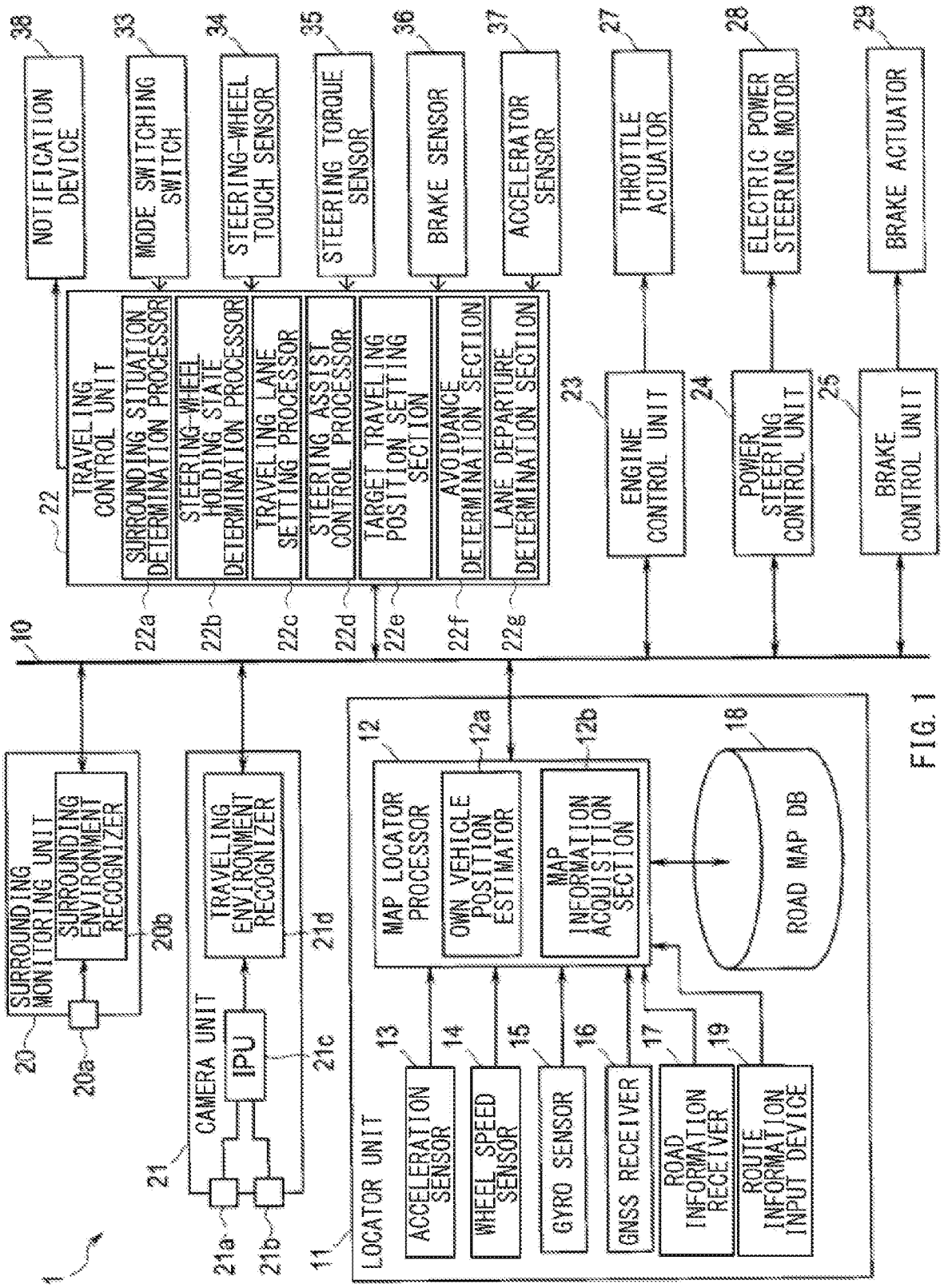
FIG. 1 is a block configuration diagram illustrating an example of an outline configuration of a drive assist apparatus according to an example embodiment of the technology.

A drive assist apparatus allows a driver to selectively turn on and off each operation of various steering assist controls including a lane keep assist control, a lane departure prevention control, and an emergency lane keeping control as described above. Accordingly, there has been a concern that the driver may feel annoyed by some combination of selected kinds of operation. For example, the drive assist apparatus may keep on performing a warning presentation or the like even if it is unnecessary.

To give an example, assume a case where the drive assist apparatus causes a vehicle to travel while the lane departure prevention control is in an OFF state, i.e., an operation prohibited state, and the emergency lane keeping control is in an ON state, i.e., an operation standby state. In this case, one possible situation may be a situation in which the own vehicle is to deviate from a lane on which the own vehicle is traveling into an adjacent lane, and at the same time, another vehicle such as an oncoming vehicle or a subsequent vehicle traveling on the adjacent lane is detected.

In such a situation, the drive assist apparatus of the own vehicle may execute the emergency lane keeping control, which is in the operation standby state, i.e., the ON state. This execution of the emergency lane keeping control may be triggered by the detection of the other vehicle such as the oncoming vehicle or the subsequent vehicle. In this case, the drive assist apparatus may first perform a waring presentation, and thereafter execute a steering assist control substantially similar to the lane departure prevention control. The waring presentation may be, for example, a visual waring, an audio waring, or any other kind of warning. There is a provision that, in general, while the emergency lane keeping control is being executed, the warning presentation should be continuously performed until the emergency lane keeping control is completed.

Accordingly, in a case where the emergency lane keeping control is started in the above-described situation, sometimes the other vehicle that has triggered the execution of the emergency lane keeping control moves away from around the own vehicle by passing, overtaking, or the like, and no other vehicle is present around the own vehicle. Even in such a case, the warning presentation may be continuously performed until the emergency lane keeping control that has once been started is completed.

That is, the warning presentation may be continuously performed after the emergency lane keeping control is started, even if the other vehicle such as the oncoming vehicle or the subsequent vehicle is no longer present around the own vehicle and a vehicle that may cause a hazard to the own vehicle is not present anymore. In such a situation, the driver may feel the warning presentation annoying. In addition, the warning may be incomprehensible to the driver and give a sense of strangeness to him or her.

Some drive assist apparatuses are configured to determine a steering-wheel holding state by detecting steering torque applied to a steering device, for example. With such a configuration, for example, in a case where a vehicle for which a steering assist control is being executed is traveling in a situation allowing for a minimum steering operation, a value of generated steering torque sometimes becomes a threshold for determination of the steering-wheel holding state or less. The situation allowing for the minimum steering operation may be, for example, a long flat straight road. In such a case, even though the driver is holding a steering wheel and the steering-wheel holding state is therefore achieved, the drive assist apparatus may falsely determine that the steering-wheel holding state is not achieved. As a result, the steering assist control being currently executed may be canceled, which can be a concern.

As described above, the existing drive assist apparatus may perform operation to cancel the steering assist control due to falsely determining the steering-wheel holding state. In such a case, the steering assist control may be canceled against the driver's intention. This may make the driver feel annoyed. For example, the driver may have to perform an operation to restart the steering assist control.

Accordingly, for example, consideration has been given to a configuration provided with another different sensor in addition to the steering torque sensor as a device to determine the steering-wheel holding state. Non-limiting examples of such an additional sensor may include a steering-wheel touch sensor that detects a holding state by a touch on the steering wheel. Adopting such a configuration makes it possible to reliably determine the steering-wheel holding state, i.e., the state in which the driver is holding the steering-wheel, which leads to expectation for further improvement in user-friendliness.

However, in a case where the steering-wheel touch sensor is provided in addition to the steering torque sensor as a device to determine the steering-wheel holding state, the additionally provided steering-wheel touch sensor can easily be a cause of false determination, for example, in living-state determination which is to be performed upon execution of a control for driver abnormality. This can be another concern.

It is desirable to provide a drive assist apparatus, to be mounted on a vehicle such as an automobile, that makes it possible to execute a more natural and smoother steering assist control.

In the following, some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a shape of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description.

A drive assist apparatus according to an example embodiment of the technology may be mounted on a vehicle such as an automobile, and may perform a traveling control for assistance with a driving operation performed by a driver of the vehicle.

The drive assist apparatus according to the example embodiment may use a sensing device, such as an in-vehicle camera unit or a radar, to acquire information regarding a front situation and a surrounding situation of the vehicle. Non-limiting examples of such information may include information regarding the surrounding situation of the vehicle, including another vehicle traveling ahead or around the own vehicle, a bicycle, a pedestrian, and an obstacle. Non-limiting examples of the other vehicle may include a preceding vehicle, a subsequent vehicle, an oncoming vehicle, and a side-by-side vehicle. Hereinafter, the information regarding the front situation and the surrounding situation described above may simply be referred to as "surrounding situation information". In addition to the acquired surrounding situation information, the drive assist apparatus may also recognize a road situation and the like, for example, on the basis of road map information acquired from external equipment such as a high-precision road map database by communication. The road situation may include, for example, information regarding a preceding vehicle, a subsequent vehicle, and various obstacles. The drive assist apparatus according to the example embodiment may use these various pieces of information (e.g., the surrounding situation information, map information, and recognized information) as appropriate, as information to be used in executing the traveling control for the assistance with the driver's driving operation.

A description is given first of an outline configuration of a drive assist apparatus 1 according to an example embodiment of the technology, with reference to a block configuration diagram illustrated in FIG. 1.

The drive assist apparatus 1 according to the example embodiment may basically have a configuration substantially similar to a configuration of an existing type of drive assist apparatus. Therefore, in describing the configuration of the drive assist apparatus 1 according to the example embodiment, only a major configuration of the drive assist apparatus 1 is briefly described. Assuming that a minor configuration of the drive assist apparatus 1 according to the example embodiment is substantially similar to that of the existing drive assist apparatus, a detailed description of a configuration other than the configuration directly related to the example embodiment of the technology may be omitted. FIG. 1 illustrates only the major configuration of the drive assist apparatus 1 according to the example embodiment, and does not illustrate the configuration not directly related to the example embodiment of the technology.

As illustrated in FIG. 1, the drive assist apparatus 1 according to the example embodiment may include, for example but not limited to, a locator unit 11, a surrounding monitoring unit 20, a camera unit 21, a traveling control unit 22, an engine control unit 23, a power steering control unit 24, and a brake control unit 25 as units of the major configuration. In one embodiment, the traveling control unit 22 may serve as a "traveling control device".

The locator unit 11, the surrounding monitoring unit 20, and the camera unit 21 may be sensor units adapted for recognition of a traveling environment inside and outside the vehicle, and may serve as environment recognition devices. The locator unit 11, the surrounding monitoring unit 20, and the camera unit 21 may be configuration units that are completely independent of each other.

The locator unit 11, the surrounding monitoring unit 20, the camera unit 21, and the control units including the traveling control unit 22, the engine control unit 23, the power steering control unit 24, and the brake control unit 25 may be coupled to each other via an in-vehicle communication line 10, such as a controller area network (CAN), and may share data on an as-needed basis.

The locator unit 11 may be an information acquisition device that estimates a position of the own vehicle (i.e., an own vehicle position) on a road map, and acquires road map information, for example, mainly on a space ahead of the estimated own vehicle position.

The locator unit 11 may include a map locator processor 12, an acceleration sensor 13, a wheel speed sensor 14, a gyro sensor 15, a global navigation satellite system (GNSS) receiver 16, a road information receiver 17, a high-precision road map database (DB) 18 serving as a map information storage, and a route information input device 19, for example. The high-precision road map database 18 is abbreviated as a "road map DB" in FIG. 1.

Among the above-described devices, the acceleration sensor 13, the wheel speed sensor 14, and the gyro sensor 15 may be various sensors to be used in estimating the position of the own vehicle (i.e., the own vehicle position). For example, the acceleration sensor 13 may detect a longitudinal acceleration of the own vehicle. The wheel speed sensor 14 may detect a speed of rotation of each of a front-right wheel, a front-left wheel, a rear-right wheel, and a rear-left wheel. The gyro sensor 15 may detect an angular velocity or angular acceleration of the own vehicle. The acceleration sensor 13, the wheel speed sensor 14, and the gyro sensor 15 may be an autonomous traveling sensor group configured to acquire a driving state of the own vehicle, and may be coupled to the input side of the map locator processor 12.

The autonomous traveling sensor group including the acceleration sensor 13, the wheel speed sensor 14, and the gyro sensor 15 may be a sensor group provided to allow for autonomous traveling in a situation, for example, inside a tunnel, where low sensitivity for reception from unillustrated GNSS satellites inhibits effective reception of positioning signals. The autonomous traveling sensor group may include other sensors, for example, a vehicle speed sensor and a yaw rate sensor, in addition to the acceleration sensor 13, the wheel speed sensor 14, and the gyro sensor 15.

The GNSS receiver 16 may be configured to acquire the own vehicle position acquisition. The GNSS receiver 16 may be a reception device that receives various pieces of information from a global navigation satellite system (GNSS), for example. In other words, the GNSS receiver 16 may receive positioning signals from a plurality of positioning satellites. The GNSS receiver 16 may output the acquired positioning signals to the map locator processor 12 of the locator unit 11. The map locator processor 12 may estimate the own vehicle position, e.g., a latitude and a longitude, on the basis of the positioning signals from the positioning satellites received by the GNSS receiver 16. Accordingly, the GNSS receiver 16 may be coupled to the input side of the map locator processor 12.

For example, the road information receiver 17, the high-precision road map database 18 serving as a storage, and the route information input device 19 may also be coupled to the map locator processor 12.

The road information receiver 17 may be a reception device that receives and acquires various pieces of information accumulated in an unillustrated cloud server coupled via an unillustrated predetermined base station or the Internet. Non-limiting examples of the various pieces of information may include information to be used for automatic driving and map information. The road information receiver 17 may output the acquired various pieces of information to the map locator processor 12 of the locator unit 11. Note that the road information receiver 17 may further be configured to transmit various pieces of information of the own vehicle to the unillustrated base station or cloud server, for example, to serve as a road information transmission and reception device.

The map locator processor 12 may perform map matching of the own vehicle position on the map, for example, on the basis of the map information received by the road information receiver 17, and may construct a target traveling route from the own vehicle position to an inputted destination. On the constructed target traveling route, the map locator processor 12 may further set a target traveling route for execution of the automatic driving, for several kilometers ahead of the own vehicle. Items to be set as the target traveling route may include various items including, without limitation, a lane on which the own vehicle is to travel (e.g., which lane to travel on in a case where there are three lanes), a lane change to be performed to pass a preceding vehicle, and a timing of starting the lane change.

The high-precision road map database 18 may mainly include a large-capacity storage medium, such as a hard disk drive (HDD) or a solid state drive (SSD). The high-precision road map database 18 may have known high-precision road map information, e.g., a local dynamic map, stored therein. The high-precision road map information may have the same hierarchical structure as, for example, a global dynamic map included in the unillustrated cloud server. The high-precision road map information may have a hierarchical structure in which, for example, additional map information is superimposed on the lowest static information layer as a base. The additional map information may be provided for assistance with the automatic driving.

The additional map information may include static positional information and dynamic positional information. Non-limiting examples of the static positional information may include types of roads (e.g., a general road and an expressway), a road shape, left and right lane lines such as a lane boundary, an entrance to or an exit from a road such as an expressway or a bypass road, a length or start and end positions of an entrance to or an exit from a branch lane or a merging lane coupled to a place such as a junction, a service area, or a parking area. Non-limiting examples of the dynamic positional information may include information regarding traffic congestion, and traffic restrictions due to an accident or construction work.

In a case where the target traveling route is set by the map locator processor 12, the additional map information may be continuously acquired from the global dynamic map and sequentially updated, as surrounding information to be used to cause the own vehicle to travel autonomously along the set target traveling route, as will be described later.

The high-precision road map information may also hold lane data to be used in performing the automatic driving. Non-limiting examples of the lane data may include lane width data, lane middle position coordinate data, lane forwarding azimuth angle data, and speed limit data. These pieces of information, such as the lane data, may be held at intervals of several meters in each lane on the road map.

The route information input device 19 may be a terminal device to be operated by a person riding on the vehicle, such as the driver or an occupant. The route information input device 19 may be configured to allow for a collective input of a series of pieces of information to be used when the map locator processor 12 sets the target traveling route. The setting of the target traveling route may include, for example, setting of a destination or a via-point. Non-limiting examples of the via-point may include a service area on an expressway.

In one example, the route information input device 19 may include an input unit (e.g., a touch panel of a monitor) of a car navigation system, a mobile terminal such as a smart phone, and/or a personal computer, without limitation. The route information input device 19 may be coupled to the map locator processor 12 by wire or wirelessly. Thus, the route information input device 19 may accept an operation, performed by the driver or the occupant, of inputting information regarding the destination or the via-point. Non-limiting examples of such information may include a name of facilities, an address, and a telephone number. The information thus inputted may be read by the map locator processor 12. The map locator processor 12 may set positional coordinates, e.g., a latitude and a longitude, of the destination and/or the via-point inputted from the route information input device 19.

The map locator processor 12 may include an own vehicle position estimator 12a and a map information acquisition section 12b, for example.

The own vehicle position estimator 12a may be configured to estimate the own vehicle position. The own vehicle position estimator 12a may acquire positional coordinates, e.g., a latitude and a longitude, of the own vehicle on the basis of the positioning signals received by the GNSS receiver 16. The own vehicle position estimator 12a may perform map matching of the acquired positional coordinates on the route map information, to thereby estimate the own vehicle position, i.e., a current location, on the road map.

In an environment, e.g., inside a tunnel, in which lowered sensitivity of the GNSS receiver 16 inhibits reception of valid positioning signals from the positioning satellites, the own vehicle position estimator 12a may switch to autonomous navigation, and estimate the own vehicle position, e.g., a latitude and a longitude, on the road map. The autonomous navigation may estimate the own vehicle position on the basis of data including, without limitation, vehicle speed data determined on the basis of the wheel speed detected by the wheel speed sensor 14, angular velocity data detected by the gyro sensor 15, and longitudinal acceleration data detected by the acceleration sensor 13.

The map information acquisition section 12b may create target traveling route information in accordance with a preset route condition, on the basis of the positional information, e.g., the latitude and the longitude, of the own vehicle position estimated by the own vehicle position estimator 12a, and on the basis of the positional information, e.g., the latitude and the longitude, of the destination and/or the via-point inputted through the route information input device 19 by an occupant such as the driver, for example. The target traveling route information may be information regarding a target traveling route from the current location to the destination. In other words, the target traveling route information may indicate a route from the own vehicle position to the destination on the high-precision road map information. If any via-point is set, the target traveling route may be routed from the own vehicle position to the destination via the via-point. Non-limiting examples of the preset route condition may include a recommended route and a fastest route. In this case, the own vehicle position estimator 12a may identify a traveling lane on which the own vehicle is traveling, and acquire the road shape of the traveling lane or the merging lane, for example, stored in the road map data, for sequential storage of these pieces of information. The map information acquisition section 12b may transmit the target traveling route information to the own vehicle position estimator 12a.

In this manner, the map locator processor 12 may perform map matching of the own vehicle position estimated by the own vehicle position estimator 12a on the road map to identify the current location of the own vehicle, and acquire road map information including information regarding a situation around the current location. The map information acquisition section 12b may set the target traveling route to be taken by the own vehicle.

The camera unit 21 may be a surrounding situation information acquisition device that recognizes a situation mainly in a traveling direction of (i.e., ahead of) the own vehicle, and acquires the recognized situation as information. In one embodiment, the camera unit 21 may serve as a portion of a "surrounding situation recognition device".

The camera unit 21 may recognize, for example, another vehicle traveling in a front region or a side region of the own vehicle, a three-dimensional object, a traffic light indication, a road sign, a road marking, and other various road surrounding situations. Non-limiting examples of the other vehicle may include a preceding vehicle and a side-by-side vehicle of the own vehicle. Non-limiting examples of the three-dimensional object may include a mobile body such as a bicycle or a motorcycle traveling side by side with the own vehicle. Such a mobile body may be hereinafter simply referred to as a "mobile body or the like". Non-limiting examples of the traffic light indication may include a lighting color, a blinking state, and an arrow direction. Non-limiting examples of the road marking may include a stop line and a lane boundary.

The camera unit 21 may be fixed, for example, to the upper middle of a front portion of a vehicle compartment of the own vehicle. The camera unit 21 may include, for example but not limited to, an in-vehicle camera, which is a stereo camera, an image processing unit (IPU) 21*c*, and a traveling environment recognizer 21*d*. The in-vehicle camera may include a main camera 21*a* and a sub-camera 21*b*. The main camera 21*a* and the sub-camera 21*b* may be disposed at symmetrical positions with respect to the middle in a vehicle-width direction. The camera unit 21 may cause the main camera 21*a* to capture reference image data, and cause the sub-camera 21*b* to capture comparative image data. The respective two pieces of image data acquired by the two cameras, i.e., the main camera 21*a* and the sub-camera 21*b*, may be subjected to predetermined image processing by the IPU 21*c*.

The traveling environment recognizer 21*d* may read the reference image data and the comparative image data that have been subjected to the image processing by the IPU 21*c*. The traveling environment recognizer 21*d* may recognize the same object in the two images on the basis of parallaxes between the two images, and calculate distance data by using the principle of triangulation. The distance data may be information of a distance from the own vehicle to the object. The traveling environment recognizer 21*d* may thereby recognize the object and the distance data thereof as front situation information.

The camera unit 21 may recognize, for example, lane lines that define the left edge and the right edge of the traveling lane of the own vehicle, i.e., lane boundaries, as the front situation information.

The front situation information may include, for example but not limited to, a road shape of a traveling road on which the own vehicle is traveling. Non-limiting examples of the traveling road may include a merging lane and a traveling lane. Non-limiting examples of the road shape may include a lane boundary which is a lane line defining the left side and the right side and indicates a lane, a road curvature (1/m) at the middle of the lane lines, and a width from the left lane line to the right lane line, i.e., a lane width. The front situation information may further include, for example but not limited to: an entrance and an exit of a road such as an expressway or a bypass road; a lane width between lane lines closer to a merging lane or a branch lane leading to a junction; an intersection; a crosswalk; a traffic light; a road sign; and a roadside obstacle. Non-limiting examples of the roadside obstacle may include a utility pole, a telephone pole, and a parked vehicle. The front situation information may further include, for example but not limited to, various kinds of information including image information representing a behavior of another vehicle that is traveling ahead of or around the own vehicle. The front situation information may be supplied to the traveling control unit 22.

The traveling environment recognizer 21*d* may perform a process such as predetermined pattern matching on the two pieces of image data, and thereby recognize a guard rail, a curb, and a three-dimensional object present along the road. In recognizing the three-dimensional object, the traveling environment recognizer 21*d* may recognize, for example but not limited to, a kind of the three-dimensional object, a distance to the three-dimensional object, a speed of the three-dimensional object, and a relative speed between the three-dimensional object and the own vehicle.

The cameras, i.e., the main camera 21*a* and the sub-camera 21*b*, may be also configured to acquire sound information together with the image information. In this case, the sound information acquired together with the image information may be included in the front situation information as sound information related to the front situation of the own vehicle.

The surrounding monitoring unit 20 may serve as the surrounding situation information acquisition device that recognizes a situation surrounding the own vehicle and acquires the situation as information. In one embodiment, the surrounding monitoring unit 20 may serve as a portion of the "surrounding situation recognition device". The surrounding monitoring unit 20 may include, for example but not limited to, a surrounding situation recognition sensor 20*a* and a surrounding environment recognizer 20*b*.

The surrounding situation recognition sensor 20*a* may be, for example, an autonomous sensor group that serves to perform surrounding situation detection. The surrounding situation recognition sensor 20*a* may include, for example, a sensing device such as an ultrasonic sensor, a millimeter-wave radar, a light detection and ranging (LiDAR), a camera, or a combination thereof.

In one example, the surrounding situation recognition sensor 20*a* may include a plurality of millimeter-wave radars disposed at four respective corners of the vehicle. For example, the millimeter-wave radars may be disposed at a left-front-side portion, a right-front-side portion, a left-rear-side portion, and a right-rear-side portion of the vehicle. Of these millimeter-wave radars, the left-front-side millimeter-wave radar and the right-front-side millimeter-wave radar may be disposed, for example, at a left-side portion and a right-side portion of a front bumper, respectively. The left-front-side millimeter-wave radar and the right-front-side millimeter-wave radar may be used to monitor a partial region around the vehicle which is difficult to recognize from the images acquired by the two cameras, i.e., the main camera 21*a* and the sub-camera 21*b*, of the camera unit 21. Such a partial region around the vehicle may be, for example, a left-front region, a right-front region, and side regions of the vehicle.

The left-rear-side millimeter-wave radar and the right-rear-side millimeter-wave radar may be provided, for example, at a left-side portion and a right-side portion of a rear bumper, respectively. The left-rear-side millimeter-wave radar and the right-rear-side millimeter-wave radar may be used to monitor a partial region around the vehicle which is difficult to monitor by the left-front-side millimeter-wave radar and the right-front-side millimeter-wave radar. Such a partial region around the vehicle may be, for example, a region from the sides to the rear of the vehicle.

The surrounding environment recognizer 20*b* may acquire surrounding situation information on the basis of an output signal from the surrounding situation recognition sensor 20*a*. The surrounding situation information may be information related to a mobile body around the own vehicle. Non-limiting examples of such a mobile body may include a side-by-side vehicle, a subsequent vehicle traveling on the traveling lane of the own vehicle or a lane adjacent thereto, and an oncoming vehicle.

The surrounding monitoring unit 20 and the camera unit 21 may together serve as the surrounding situation information acquisition device of the drive assist apparatus 1 of the example embodiment. In one embodiment, the surrounding monitoring unit 20 and the camera unit 21 may serve as the "surrounding situation recognition device". The traveling environment recognizer 21*d* of the camera unit 21 and the surrounding environment recognizer 20*b* of the surrounding monitoring unit 20 may be coupled to the input side of the traveling control unit 22 via the in-vehicle communication line 10. Further, the traveling control unit 22 and the map locator processor 12 may be coupled to each other via the in-vehicle communication line 10 to freely perform bidirectional communication. Further, for example, a mode switching switch 33, a steering-wheel touch sensor 34, a steering torque sensor 35, a brake sensor 36, and an accelerator sensor 37 may be also coupled to the input side of the traveling control unit 22, as various switches or a group of sensors that detect vehicle internal situation information.

The mode switching switch 33 may be a group of switches that perform ON-OFF switching to allow the driver to select various driving modes or a plurality of kinds of control operation related to the drive assist control. The driver may be allowed to selectively perform ON-OFF switching of various driving modes by operating the mode switching switch 33. The various driving modes may include, for example but not limited to, a manual driving mode, a first drive assist mode, a second drive assist mode, and a retreat mode.

The manual driving mode may be a driving mode that requires the driver to hold the steering wheel. For example, the manual driving mode may cause the own vehicle to travel in accordance with the driving operation performed by the driver. Non-limiting examples of the driving operation performed by the driver may include a steering operation, an acceleration operation, and a braking operation.

The first drive assist mode may be a semi-automatic driving mode that requires the driver to hold the steering wheel, but assists the operation of the driver in accordance with a situation such as the surrounding environment of the own vehicle recognized by the various sensors, while taking in the driving operation performed by the driver. That is, the first drive assist mode may be a semi-automatic driving mode that controls units including the engine control unit 23, the power steering control unit 24, and the brake control unit 25 to perform various controls in combination, and thereby allows the own vehicle to travel along the set target traveling route. The various controls may mainly include a preceding vehicle following control, a lane keep assist control, a lane departure prevention control, and an emergency lane keeping control.

The second drive assist mode may not require the driver to hold the steering wheel or to perform an operation such as the acceleration operation or the braking operation. The second drive assist mode may be an automatic driving mode that controls the units including the engine control unit 23, the power steering control unit 24, and the brake control unit 25 to perform various controls in combination, and thereby allows the own vehicle to automatically travel along the target traveling route. The various controls may mainly include the preceding vehicle following control, the lane keep assist control, and the lane departure prevention control.

The retreat mode may be an emergency driving mode that allows the own vehicle to stop automatically and safely, for example, in a case where: the own vehicle is traveling in the first or the second drive assist mode; the traveling of the own vehicle is not continuable any longer; and it is difficult to have the driver take over the driving operation, i.e., it is difficult to switch the driving mode to the manual driving mode or the first drive assist mode. The control to be executed in the retreat mode may be the later-described control which is sometimes called a "control for driver abnormality".

The mode switching switch 33 may also serve as an operation member that allows the driver to selectively perform ON-OFF switching of each operation of some of the various steering assist controls, for example, the lane keep assist control, the lane departure prevention control, and the emergency lane keeping control.

The steering-wheel touch sensor 34 may be configured to detect a state in which the driver is holding an unillustrated steering wheel of a steering device, i.e., a steering-wheel holding state. The steering-wheel touch sensor 34 may be provided on the steering wheel of the vehicle. The steering-wheel touch sensor 34 may output an ON signal in a case where the steering wheel is held, i.e., the steering-wheel holding state is achieved.

The steering torque sensor 35 may detect steering torque as an amount of the driving operation performed by the driver. The steering torque sensor 35 may be provided on an unillustrated steering shaft of the steering device of the vehicle.

The steering-wheel touch sensor 34 and the steering torque sensor 35 may both be sensors configured to recognize the steering-wheel holding state, i.e., the state in which the driver is holding the steering wheel of the own vehicle. In one embodiment, the steering-wheel touch sensor 34 and the steering torque sensor 35 may serve as a "steering-wheel holding state recognizer". The respective output signals from the steering-wheel touch sensor 34 and the steering torque sensor 35 may be supplied to a steering-wheel holding state determination processor 22*b* of the traveling control unit 22 which will be described later.

The brake sensor 36 may detect an amount by which a brake pedal is pressed, as an amount of the driving operation performed by the driver. The accelerator sensor 37 may detect an amount by which an accelerator pedal is pressed, as an amount of the driving operation performed by the driver.

Coupled to the output side of the traveling control unit 22 may be a device such as a notification device 38. The notification device 38 may include, for example but not limited to, a monitor panel and a speaker. The notification device 38 may notify the driver of a warning based on a situation recognized by the traveling control unit 22 on the basis of information such as the front situation information or the surrounding situation information acquired by the traveling environment recognizer 21*d* and the surrounding environment recognizer 20*b*. Non-limiting examples of such a warning may include a visual warning presentation on a display device such as the monitor panel, and an audio warning presentation with a sound generating device such as the speaker in a form of a voice or a horn sound.

In some cases, the notification device 38 may perform various presentations that are visually or audibly perceivable by the driver and that each suggest an operation to be performed by the driver. For example, the notification device 38 may perform a suggesting presentation as "please press down the brake pedal", "please release the accelerator pedal", or "please perform a steering correction operation".

The traveling control unit 22 may include, for example but not limited to, a surrounding situation determination processor 22*a*, the steering-wheel holding state determination processor 22*b*, a traveling lane setting processor 22*c*, and a steering assist control processor 22*d*.

The surrounding situation determination processor 22*a* may determine the surrounding situation of the own vehicle on the basis of a result of recognition performed by the surrounding situation recognition device, i.e., the surrounding monitoring unit 20 and the camera unit 21.

The steering-wheel holding state determination processor 22*b* may determine the steering-wheel holding state, i.e., the state in which the driver of the own vehicle is holding the steering wheel, on the basis of a result of recognition performed by the steering-wheel holding state recognizer, i.e., the steering-wheel touch sensor 34 and the steering torque sensor 35.

The traveling lane setting processor 22c may set the traveling lane on which the own vehicle is to travel, on the basis of information such as: the front situation information recognized by the surrounding situation recognition device, i.e., the traveling environment recognizer 21d of the camera unit 21; or the surrounding situation information of the own vehicle recognized by the surrounding environment recognizer 20b of the surrounding monitoring unit 20.

The traveling lane setting processor 22c may receive, for example, the lane recognition information included in the front situation information supplied from the camera unit 21. The traveling lane setting processor 22c may thereby calculate a road curvature at the middle of the left and the right lane lines, i.e., the lane boundaries, of the traveling lane of the own vehicle, and detect a lateral position deviation of the own vehicle in the vehicle-width direction using the middle of the left and the right lane lines as a reference.

Various methods are known for calculating the road curvature at the middle of the lane lines and the lane width. However, for example, the traveling environment recognizer 21d may recognize the left and the right lane lines by a binarization process using a brightness difference on the basis of the front traveling environment image information. The traveling environment recognizer 21d may calculate a curvature of each of the left and the right lane lines for each predetermined zone by a curve approximation formula based on a least-square method. The traveling environment recognizer 21d may calculate the lane width from a difference between the respective curvatures of the left and the right lane lines. Further, the traveling environment recognizer 21d may calculate the road curvature at the middle of the lane on the basis of the calculated curvatures of the left and the right lane lines and the calculated lane width. Further, the traveling environment recognizer 21d may calculate the lateral position deviation of the own vehicle using the middle of the lane as a reference, i.e., an own vehicle lateral position deviation which is a distance from the middle of the lane to the middle of the own vehicle in the vehicle-width direction.

The steering assist control processor 22d may execute various steering assist controls. The various steering assist controls may assist a steering operation for allowing the vehicle to travel stably within the traveling lane. In addition, the various steering assist controls may assist a steering operation which the driver performs to allow the vehicle to avoid, for example, a hazard to encounter while traveling.

The steering assist control processor 22d may include, for example but not limited to, a target traveling position setting section 22e, an avoidance determination section 22f, and a lane departure determination section 22g.

The target traveling position setting section 22e may set a target traveling position of the own vehicle within the traveling lane set by the traveling lane setting processor 22c. The target traveling position may be, for example, a position at the middle of the lane which will be hereinafter referred to as a "lane middle position".

The avoidance determination section 22f may determine whether an avoidance behavior is necessary, in a case where the surrounding situation recognition device has recognized that a predetermined target object is present on a line passing through the target traveling positions set by the target traveling position setting section 22e. The avoidance behavior may be a behavior of the own vehicle to avoid the target object.

The lane departure determination section 22g may determine a lane departure situation while the own vehicle is traveling on the traveling lane set by the traveling lane setting processor 22c. For example, the lane departure determination section 22g may determine whether the own vehicle is to depart from the set traveling lane into an adjacent lane, as the lane departure situation. Further, in a case where the avoidance determination section 22f has determined that the avoidance behavior with respect to the target object recognized as being present in front of the own vehicle is necessary, the lane departure determination section 22g may determine a lane departure situation on the basis of a lateral positional relationship between the own vehicle and the target object. For example, the lane departure determination section 22g may determine whether the own vehicle departs from the traveling lane if the own vehicle executes the avoidance behavior, as the lane departure situation.

The traveling control unit 22 may cause, for example but not limited to, the surrounding situation determination processor 22a and the steering-wheel holding state determination processor 22b to perform various kinds of predetermined situation determination on the basis of: output information supplied from the traveling environment recognizer 21d of the camera unit 21 and the surrounding environment recognizer 20b of the surrounding monitoring unit 20, i.e., the surrounding situation recognition device; various pieces of information obtained via the map locator processor 12; the vehicle internal situation information acquired by the mode switching switch 33 and various sensors including the steering-wheel touch sensor 34, the steering torque sensor 35, the brake sensor 36, and the accelerator sensor 37; and any other suitable information. On the basis of results of the various kinds of predetermined situation determination, the traveling control unit 22 may perform a traveling control of the own vehicle by means of the units including the engine control unit 23, the power steering control unit 24, and the brake control unit 25.

In a case where an automatic driving zone is set on the target traveling route set by the map locator processor 12, the traveling control unit 22 may set a traveling route to perform an automatic driving control in the set automatic driving zone. The automatic driving zone may be a zone in which the automatic driving control is permitted. The traveling control unit 22 may also be configured to cause the own vehicle to automatically travel in the second drive assist mode along the target traveling route set from the own vehicle position estimated on the basis of various pieces of information in the automatic driving zone, by appropriately controlling the units including the engine control unit 23, the power steering control unit 24, and the brake control unit 25.

In such a case, the traveling control unit 22 may cause the own vehicle to travel, for example, by performing a control such as the preceding vehicle following control or the lane keep assist control on the basis of the front situation information recognized by the traveling environment recognizer 21d. For example, in a case where a preceding vehicle is detected, the traveling control unit 22 may thereby cause the own vehicle to follow the preceding vehicle. For example, in a case where no preceding vehicle is detected, the traveling control unit 22 may thereby cause the own vehicle to travel within a vehicle speed set within a speed limit. Further, the traveling control unit 22 may execute the steering assist control selected as appropriate, for example, the lane keep assist control, the lane departure prevention control, or the emergency lane keeping control. The traveling control unit 22 may also perform a traveling control such as execution of the control for driver abnormality in some cases.

The control for driver abnormality may be a technique for allowing the vehicle to stop automatically and safely, for example, in a case where the drive assist apparatus 1 according to the example embodiment is performing a control such as the automatic driving control and where it becomes difficult to have the driver take over the driving operation from the drive assist apparatus 1.

As described above, the traveling control unit 22 may be coupled to each of the control units including the engine control unit 23, the power steering control unit 24, and the brake control unit 25 via the in-vehicle communication line 10. This may allow the traveling control unit 22 to control each of the control units including the engine control unit 23, the power steering control unit 24, and the brake control unit 25.

Coupled to the output side of the engine control unit 23 may be a throttle actuator 27. The throttle actuator 27 may cause a throttle valve of an electronic control throttle provided in a throttle body of an engine to open and close. The throttle actuator 27 may cause the throttle valve to open and close on the basis of a driving signal supplied from the engine control unit 23 and thereby adjust an intake air flow rate. The throttle actuator 27 may thus generate a desired engine output.

Coupled to the output side of the power steering control unit 24 may be an electric power steering motor 28. The electric power steering motor 28 may provide steering torque to a steering mechanism with use of rotational force of an electric motor. In a driving mode other than the manual driving mode, i.e., in the first and the second drive assist modes and the retreat mode, the electric power steering motor 28 may be controlled to operate on the basis of a driving signal supplied from the power steering control unit 24. This may allow for execution of various steering assist controls that assist an operation performed on the steering wheel, i.e., steering. The steering torque sensor 35 may detect, for example, variation in the driving amount of the electric power steering motor 28 or the driving amount of the steering mechanism, and thereby present a steering torque value.

Coupled to the output side of the brake control unit 25 may be a brake actuator 29. The brake actuator 29 may be configured to adjust brake hydraulic pressure applied to a brake wheel cylinder provided on each wheel. When the brake actuator 29 is driven on the basis of a driving signal supplied from the brake control unit 25, the brake actuator 29 may generate braking force on each wheel by means of the brake wheel cylinder to thereby forcibly decelerate the vehicle.

For example, the map locator processor 12, the surrounding environment recognizer 20b, the traveling environment recognizer 21d, the traveling control unit 22, the engine control unit 23, the power steering control unit 24, and the brake control unit 25 may each include: a known microcomputer including, without limitation, a central processing unit (CPU), a random-access memory (RAM), a read-only memory (ROM), and a non-volatile storage; and a peripheral device thereof. The ROM may have, for example, a program to be executed by the CPU and fixed data such as a data table that have been stored therein in advance. The outline configuration of the drive assist apparatus 1 according to the example embodiment may be as described above.

An example working of the drive assist apparatus according to one embodiment of the technology having the above-described configuration is described below.

The example embodiment is described referring to an example case of a left-hand traffic road system in which the own vehicle travels on the left side. Therefore, in a case of applying the example embodiment to a right-hand traffic road system, "left" in the description should be read as "right", and "right" in the description should be read as "left". Thus, the example embodiment may be easily applicable to the right-hand traffic road system.

A description is given first below of a basic working of the lane departure prevention control and the emergency lane keeping control among the steering assist controls to be executed by the drive assist apparatus 1 according to the example embodiment.

Figure 2:
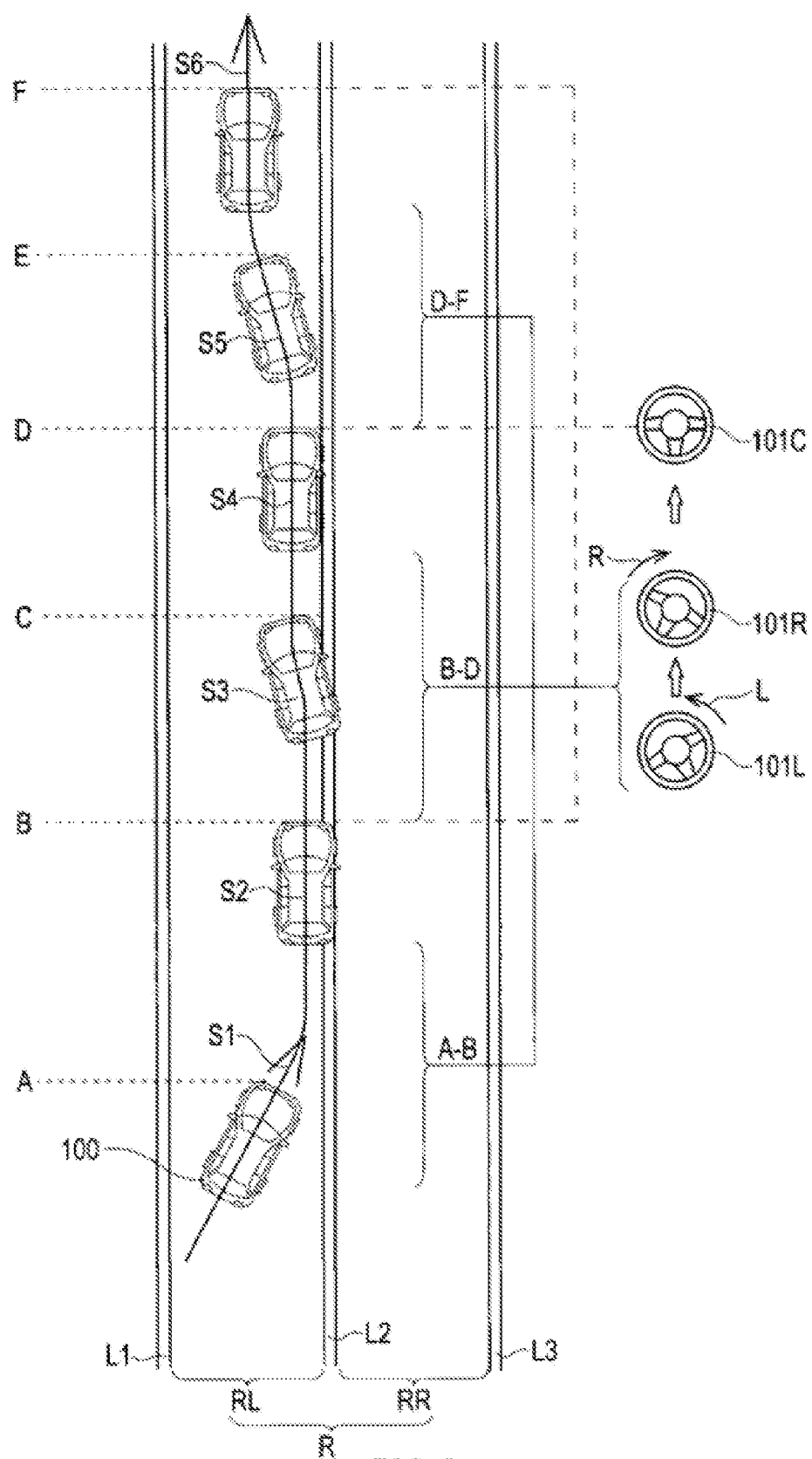
FIG. 2 is a diagram for schematically describing a working of a normal lane departure prevention control to be performed by the drive assist apparatus according to the example embodiment.

FIG. 2 is a diagram for schematically describing a normal lane departure prevention control to be performed by the drive assist apparatus 1 according to the example embodiment. Note that, basically, the lane departure prevention control to be performed by the drive assist apparatus 1 according to the example embodiment may be substantially similar to an existing known lane departure prevention control. The following description simply refers to a basic working in a case where the lane departure prevention control is executed alone. Therefore, FIG. 2 illustrates only the working of the lane departure prevention control which does not involve ON-OFF states of controls other than the lane departure prevention control, and interventions and influences thereof.

FIG. 2 illustrates an example based on the assumption that there is a two-lane shuttle-traffic road R and an own vehicle 100 is traveling in a region within a left lane RL. In this example, the road R includes the left lane RL which is on the left side when viewed from the driver of the own vehicle 100, and a right lane RR adjacent to the left lane RL on the right side thereof. The left lane RL is a region between a lane line L1 on the left road shoulder side and a lane line L2 at the middle. The right lane RR is a region between the lane line L2 at the middle and a lane line L3 on the right road shoulder side.

In such a case, the own vehicle 100 is traveling on the left lane RL as the traveling lane of the own vehicle, which is hereinafter sometimes referred to as an "own-vehicle traveling lane". It is further assumed that the lane departure prevention control among the steering assist controls of the drive assist apparatus 1 mounted on the own vehicle 100 is set in the ON state, i.e., the lane departure prevention control is set to be activated. Note that the example illustrated in FIG. 2 does not take into consideration controls other than the lane departure prevention control.

In such a situation, the drive assist apparatus 1 of the own vehicle 100 may recognize the lane lines L1 and L2 on both sides of the own-vehicle traveling lane by the surrounding monitoring unit 20 and the camera unit 21 together serving as the surrounding situation recognition device. Further, the drive assist apparatus 1 may set the lane RL in the region between the recognized lane lines L1 and L2 as a traveling lane on which the own vehicle 100 is to travel by the traveling lane setting processor 22c. Further, the drive assist apparatus 1 may set, for example, a lane middle position as a target traveling position of the own vehicle 100 within the set traveling lane, i.e., the lane RL, by the target traveling position setting section 22e.

Here, assume a case where the own vehicle 100 is to depart from the traveling lane (the lane RL) into the adjacent lane (the lane RR) which is an oncoming lane in the example illustrated in FIG. 2. In this case, assume a situation where the own vehicle 100 is present at a position indicated by a sign A in FIG. 2 and has a posture illustrated in FIG. 2.

Non-limiting examples of the situation in which the own vehicle 100 is to depart from the traveling lane into the adjacent lane may include a case where the own vehicle 100 does not travel straight but travels laterally to the left or to the right due to an influence of a lateral inclination of a road on which the own vehicle 100 is traveling. Non-limiting examples of the situation may further include: a case where the own vehicle 100 malfunctions; a case where the driver performs inattentive driving; a case where the driver is drowsy due to fatigue or the like; and a case where the driver is in a low conscious state due to a sudden illness or the like. Other than the above-described cases, the own vehicle 100 may possibly depart from the traveling lane, for example, in a case where: the own vehicle 100 is traveling on the set target traveling route; presence of a predetermined target object is recognized on the target traveling route; and the driver performs an abrupt steering operation as an avoidance behavior that allows the own vehicle 100 to avoid the target object.

In such a situation, the own vehicle 100 present at the position A in FIG. 2 may be in a situation where a line that is along a front-rear direction of the own vehicle 100 and is along a vector (an arrow S1) of the traveling direction of the own vehicle 100 at this timing (i.e., at the position A) has an inclination of a predetermined angle with respect to the lane lines L1 and L2 on both sides of the traveling lane RL of the own vehicle 100. Therefore, if the own vehicle 100 travels along the arrow S1 which is the vector of the traveling direction of the own vehicle 100 without changing the traveling direction, it can be predicted that the own vehicle 100 crosses the lane line L2 and thereafter departs into the adjacent lane RR, i.e., the oncoming lane. Such determination may be performed by the lane departure determination section 22g.

In a case where the own vehicle 100 is determined by the lane departure determination section 22g as being to depart from the traveling lane, the drive assist apparatus 1 of the own vehicle 100 may execute a steering assist control for lane departure prevention. The steering assist control to be executed in this case may be a control of causing the steering wheel to turn in right and left rotation directions. In FIG. 2, a state of turning of the steering wheel in the left rotation direction (i.e., a direction indicated by an arrow L) is denoted by a sign 101L, and a state of turning of the steering wheel in the right rotation direction (i.e., a direction indicated by an arrow R) is denoted by a sign 101R. Further, a state in which the steering wheel is at a neutral position is denoted by a sign 101C in FIG. 2.

In performing the lane departure prevention control, first, the drive assist apparatus 1 may perform a control (the steering assist control) of so assisting the operation on the steering wheel that the own vehicle 100 travels along a turning locus, until an angle between the line along the front-rear direction of the own vehicle 100 (e.g., the line along the arrow S1) and the lane line L2 becomes zero, i.e., until the line along the front-rear direction of the own vehicle 100 (e.g., the line along the arrow S1) and the lane line L2 becomes parallel to each other. The angle between the line along the front-rear direction of the own vehicle 100 and the lane line L2 may be referred to as a yaw angle with respect to a lane. The steering assist control in this case may be performed in a region denoted by a sign A-B in FIG. 2.

When the own vehicle 100 arrives at a position denoted by a sign B in FIG. 2, the line along the front-rear direction of the own vehicle 100 (i.e., a line along an arrow S2 at this timing (at the position B)) and the lane line L2 may become parallel to each other. The arrow S2 in FIG. 2 represents the vector of the traveling direction of the own vehicle 100 in this situation. Hereinafter, the steering assist control to be performed in a period from a timing when the own vehicle 100 is at the position A to a timing when the own vehicle 100 arrives at the position B is referred to as a "first-stage control process".

When the own vehicle 100 is at the position B, the own vehicle 100 may be traveling along the lane line L2 without crossing the lane line L2. In this state, the own vehicle 100 may be sometimes traveling with a portion thereof (e.g., a portion on the right-side surface) sticking out into a region within the lane RR which is the adjacent lane (the oncoming lane).

To address such a situation, the drive assist apparatus 1 may execute the steering assist control and the traveling assist control to guide the own vehicle 100 into the region in the traveling lane RL and cause the own vehicle 100 to travel with its right-side surface positioned along an inner edge of the lane line L2, i.e., a lane end. This steering assist control may be performed in a region denoted by a sign B-D in FIG. 2. The vector of the traveling direction of the own vehicle 100 that is traveling in the region B-D is represented by an arrow S3 in FIG. 2.

When the own vehicle 100 arrives at a position denoted by a sign D in FIG. 2, the line along the front-rear direction of the own vehicle 100 (i.e., a line along an arrow S4 at this timing (at the position D)) and the lane line L2 may become parallel to each other again. The arrow S4 in FIG. 2 represents the vector of the traveling direction of the own vehicle 100 in this situation. When the line along the front-rear direction of the own vehicle 100 (i.e., the line along the arrow S4) and the lane line L2 becomes thus parallel at the position D in FIG. 2, the drive assist apparatus 1 may thereafter cause the own vehicle 100 to travel along the lane line L2 while maintaining the state of the own vehicle 100 until a predetermined time period elapses. Hereinafter, the steering assist control to be performed in a period from a timing when the own vehicle 100 is at the position B to a timing when the own vehicle 100 arrives at the position D is referred to as a "second-stage control process".

In a period from the timing when the own vehicle 100 passes the position D to the timing when the predetermined time period elapses therefrom, the own vehicle 100 may be traveling along the inner edge of the lane line L2 (the lane end) in the region within the traveling lane RL. That is, the own vehicle 100 may have moved to the lane end of the traveling lane and be traveling while maintaining its position at the lane end. The position at the lane end may be hereinafter referred to as a "lane end position". By this timing, the own vehicle 100 may have avoided a hazard such as a contact with the oncoming vehicle.

However, in a case where the own vehicle 100 has passed the position D in FIG. 2 and continues to travel along the lane line L2, it may be highly possible that the own vehicle 100 departs from the lane again. To address this, the drive assist apparatus 1 may further perform the traveling control below.

That is, the drive assist apparatus 1 may so execute the steering assist control and the traveling assist control as to guide the own vehicle 100 to the lane middle position of the traveling lane RL and cause the own vehicle 100 to travel while maintaining its position at the lane middle position. This steering assist control may be performed in a region from a predetermined position where the own vehicle 100 is present after an elapse of a predetermined time period from the timing when the own vehicle 100 passes the position D in FIG. 2 to a position denoted by a sign F. The vector of the traveling direction of the own vehicle 100 that is traveling in this region is represented by an arrow S5 in FIG. 2.

When the own vehicle 100 arrives at the position F in FIG. 2, the line along the front-rear direction of the own vehicle 100 (i.e., a line along an arrow S6 at this timing (at the position F)) and the lane line L2 may become parallel to each other again. The arrow S6 in FIG. 2 represents the vector of the traveling direction of the own vehicle 100 in this situation. Hereinafter, the steering assist control to be performed in a period from a timing when the own vehicle 100 is at the position D to a timing when the own vehicle 100 arrives at the position F is referred to as a "third-stage control process".

When the own vehicle 100 is thus brought to a state of traveling while maintaining its position at the lane middle position of the lane RL which is the traveling lane, the lane departure prevention control by the drive assist apparatus 1 may be completed.

The above description referring to FIG. 2 is based on the assumption that: the own vehicle 100 is traveling in the region within the left lane of the two-lane shuttle-traffic road; and the own vehicle 100 is to depart into the oncoming lane. However, the situation to perform the lane departure prevention control is not limited to such a situation.

For example, the lane departure prevention control described above may be similarly applicable to a case where: there is a four-lane road (i.e., a road having two lanes on each side); the own vehicle 100 is traveling on a left lane of the two lanes on one side of the road as a traveling lane; and the own vehicle 100 is to depart from the traveling lane into an adjacent lane on the right (i.e., a passing lane). Further, there may be a lot of similar cases. For example, the lane departure prevention control described above may be similarly applicable: in a case where the own vehicle 100 is traveling on a right lane of two lanes on one side of a four-lane road, and the own vehicle 100 is to be prevented from departing from that right lane into a left lane; and in a case where the own vehicle 100 is traveling on a middle lane of three lanes on one side of a six-lane road, and the own vehicle 100 is to be prevented from departing from the middle lane into a right or left lane. This is similarly applicable to the later-described cases of the emergency lane keeping control and the control for driver abnormality, and is not limited to the above-described examples.

Figure 3:
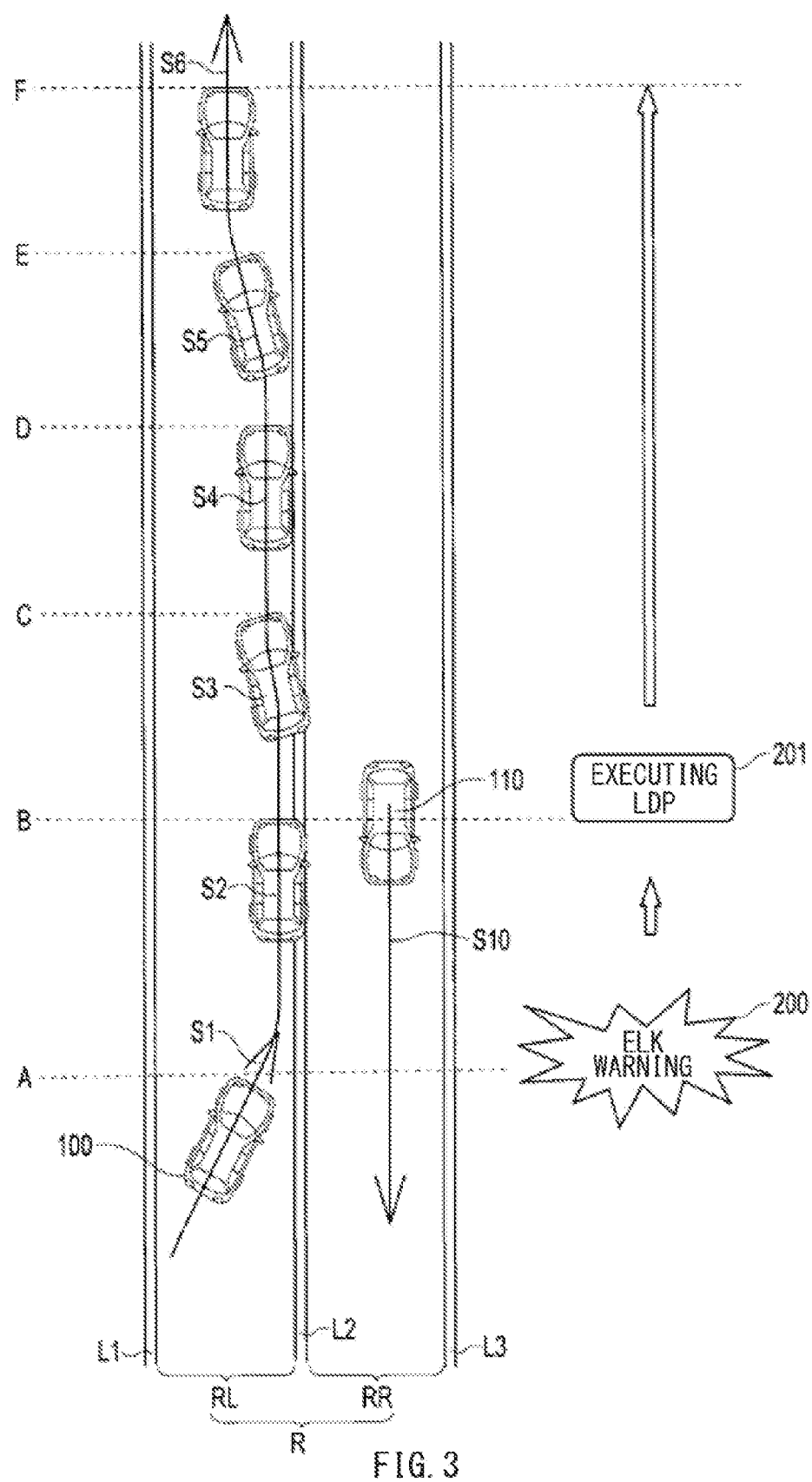
FIG. 3 is a diagram for describing an example of a working of an emergency lane keeping control to be performed by the drive assist apparatus according to the example embodiment, which is for an oncoming vehicle in a case of a first emergency lane keeping control.

FIG. 3 is a diagram for describing an example of a working of the emergency lane keeping control to be performed by the drive assist apparatus 1 according to the example embodiment. This may be for an oncoming vehicle in a case of a first emergency lane keeping control. Note that, basically, the emergency lane keeping control to be performed by the drive assist apparatus 1 according to the example embodiment may be substantially similar to an existing known lane departure prevention control. However, the emergency lane keeping control may be different from the existing known lane departure prevention control in that, in a case where the own vehicle is to depart from the lane, detection of another vehicle such as an oncoming vehicle or a subsequent vehicle triggers execution of the control. Note that the lane departure prevention control and the emergency lane keeping control may have respective control parameters that are set independently between the two controls. Therefore, the control amount may be different between the two controls.

As with FIG. 2, FIG. 3 illustrates an example case based on the assumption that the own vehicle 100 is traveling in a region within the left lane RL of the two-lane shuttle-traffic road R. Therefore, FIG. 3 includes reference signs same as those in FIG. 2. for example, the own vehicle 100, the road R, the lanes RL and RR, the lane lines L1, L2, and L3, etc.

In such a case, the own vehicle 100 is traveling on the left lane RL as the traveling lane of the own vehicle, i.e., the own-vehicle traveling lane. Further, an oncoming vehicle 110 is present on the right lane RR. The oncoming vehicle 110 may be a vehicle that is traveling in a direction opposing the own vehicle 100. It is also assumed that the lane departure prevention control and the emergency lane keeping control among the steering assist controls of the drive assist apparatus 1 mounted on the own vehicle 100 are both set in the ON state, i.e., are both set to be activated.

Hereinafter, a control to be performed in a case where both the lane departure prevention control and the emergency lane keeping control are in the ON state may be referred to as a "first emergency lane keeping control". FIG. 3 illustrates an example case of detecting an oncoming vehicle while executing the first emergency lane keeping control. The following description referring to FIG. 3 is intended to describe a working of the first emergency lane keeping control (i.e., the control to be performed in the case where both the lane departure prevention control and the emergency lane keeping control are in the ON state), and therefore does not involve ON-OFF states of controls other than the first emergency lane keeping control, and interventions and influences thereof.

In such a situation, the drive assist apparatus 1 of the own vehicle 100 may recognize the lane lines L1 and L2 on both sides of the own-vehicle traveling lane. Further, the drive assist apparatus 1 may set the lane RL in the region between the recognized lane lines L1 and L2 as a traveling lane on which the own vehicle 100 is to travel. Further, the drive assist apparatus 1 may set, for example, the lane middle position as a target traveling position of the own vehicle 100 within the set traveling lane, i.e., the lane RL. This is a situation similar to that in FIG. 2.

Here, as in the situation in FIG. 2, assume a case where the own vehicle 100 is to depart from the traveling lane (the lane RL) into the adjacent lane (the lane RR) which is the oncoming lane in the example illustrated in FIG. 3. In this case, further assume that the own vehicle 100 is present at the position A in FIG. 3 and has a posture illustrated in FIG. 3.

In such a situation, the own vehicle 100 present at the position A in FIG. 3 is in a situation where a line that is along a front-rear direction of the own vehicle 100 and is along a vector (the arrow S1) of the traveling direction of the own vehicle 100 at this timing (i.e., at the position A) has an inclination of a predetermined angle with respect to the lane lines L1 and L2 on both sides of the traveling lane (i.e., the lane RL) of the own vehicle 100. Therefore, if the own vehicle 100 travels along the arrow S1 which is the vector of the traveling direction of the own vehicle 100 without changing the traveling direction, it can be predicted that the own vehicle 100 crosses the lane line L2 and thereafter departs into the adjacent lane RR, i.e., the oncoming lane. Such determination may be performed by the lane departure determination section 22g.

Further, in such a situation, assume that: the oncoming vehicle 110 is present at a position that is within the oncoming lane (i.e., the lane RR) and is on a frontward extension of the line along the front-rear direction of the own vehicle 100 (i.e., the line along the arrow S1); the oncoming vehicle 110 is traveling in a direction along an arrow S10 in FIG. 3; and the drive assist apparatus 1 of the own vehicle 100 has detected the oncoming vehicle 110, for example, with the use of the camera unit 21.

As described above, in the situation illustrated in FIG. 3, both the lane departure prevention control and the emergency lane keeping control are in the ON state. Therefore, the drive assist apparatus 1 of the own vehicle 100 may detect that the own vehicle 100 is to depart from the traveling lane (i.e., the lane RL) and thereby start the lane departure prevention control. In response to the detection of the oncoming vehicle 110, the drive assist apparatus 1 may also start the emergency lane keeping control together with the lane departure prevention control.

In such a case, the drive assist apparatus 1 may first detect the oncoming vehicle 110, thereby start the emergency lane keeping control, and perform a warning presentation 200 illustrated in FIG. 3. The warning presentation 200 may be performed to alert the occupant such as the driver to another vehicle such as an oncoming vehicle. Non-limiting examples of the warning presentation 200 may include a visual presentation on a device such as a display panel and an audio presentation with a device such as a speaker.

Thereafter, in a case where the own vehicle 100 and the oncoming vehicle 110 pass each other, where the oncoming vehicle 110 travels away from around the own vehicle 100 and becomes absent around the own vehicle 100, and where another oncoming vehicle subsequent to the oncoming vehicle 110 is not present (i.e., no subsequent oncoming vehicle is detected), the drive assist apparatus 1 may switch the control from the emergency lane keeping control which is currently being executed to the lane departure prevention control.

Together with such switching of the control, the warning presentation 200 based on the above-described emergency lane keeping control may be switched to a predetermined state presentation 201 indicating that the lane departure prevention control is being executed. The drive assist apparatus 1 may continue to perform the state presentation 201. The working after this may be similar to that of the control described above with reference to FIG. 2.

As described above, the timing to switch from the emergency lane keeping control with the warning presentation 200 to the lane departure prevention control with the state presentation 201 may be, for example, a timing that is after the emergency lane keeping control is started and when the oncoming vehicle 110 detected as a trigger for the execution of the emergency lane keeping control and a subsequent oncoming vehicle become absent around the own vehicle 100.

There may be a case where, after the own vehicle 100 passes the oncoming vehicle 110 detected as the trigger for the execution of the emergency lane keeping control, another oncoming vehicle is present. Such another oncoming vehicle may be, for example, a subsequent oncoming vehicle that is following the oncoming vehicle 110 detected as the trigger for the execution of the emergency lane keeping control. In such a case, the drive assist apparatus 1 may further determine whether an oncoming vehicle has been detected, and may thereby continue to perform or resume the warning presentation. However, if the own vehicle 100 is brought to the state of traveling at the position B, the own vehicle 100 may be in a state of traveling along the lane line L2 without crossing the lane line L2. In this state, the own vehicle 100 may be sometimes traveling with a portion thereof sticking out into a region within the adjacent oncoming lane (i.e., the lane RR), as described above. However, by this timing, the control may have been switched from the emergency lane keeping control to the normal lane departure prevention control and the own vehicle 100 may be under continuous execution of the normal lane departure prevention control. Therefore, the traveling of the own vehicle 100 may be controlled to be in a direction away from the oncoming lane. Accordingly, it can be said that a hazard of being in contact with the oncoming vehicle is mostly avoided by this timing. Further, the warning presentation 200 in the own vehicle 100 may be canceled when the firstly detected oncoming vehicle 110 becomes absent around the own vehicle 100. However, this does not give a sense of strangeness to the driver.

The above description referring to the example case illustrated in FIG. 3 is based on the assumption that: the own vehicle 100 is traveling in the region within the left lane of the two-lane shuttle-traffic road; and the oncoming vehicle is detected on the oncoming lane. However, the situation to perform the above-described control is not limited to such a situation.

Figure 4:
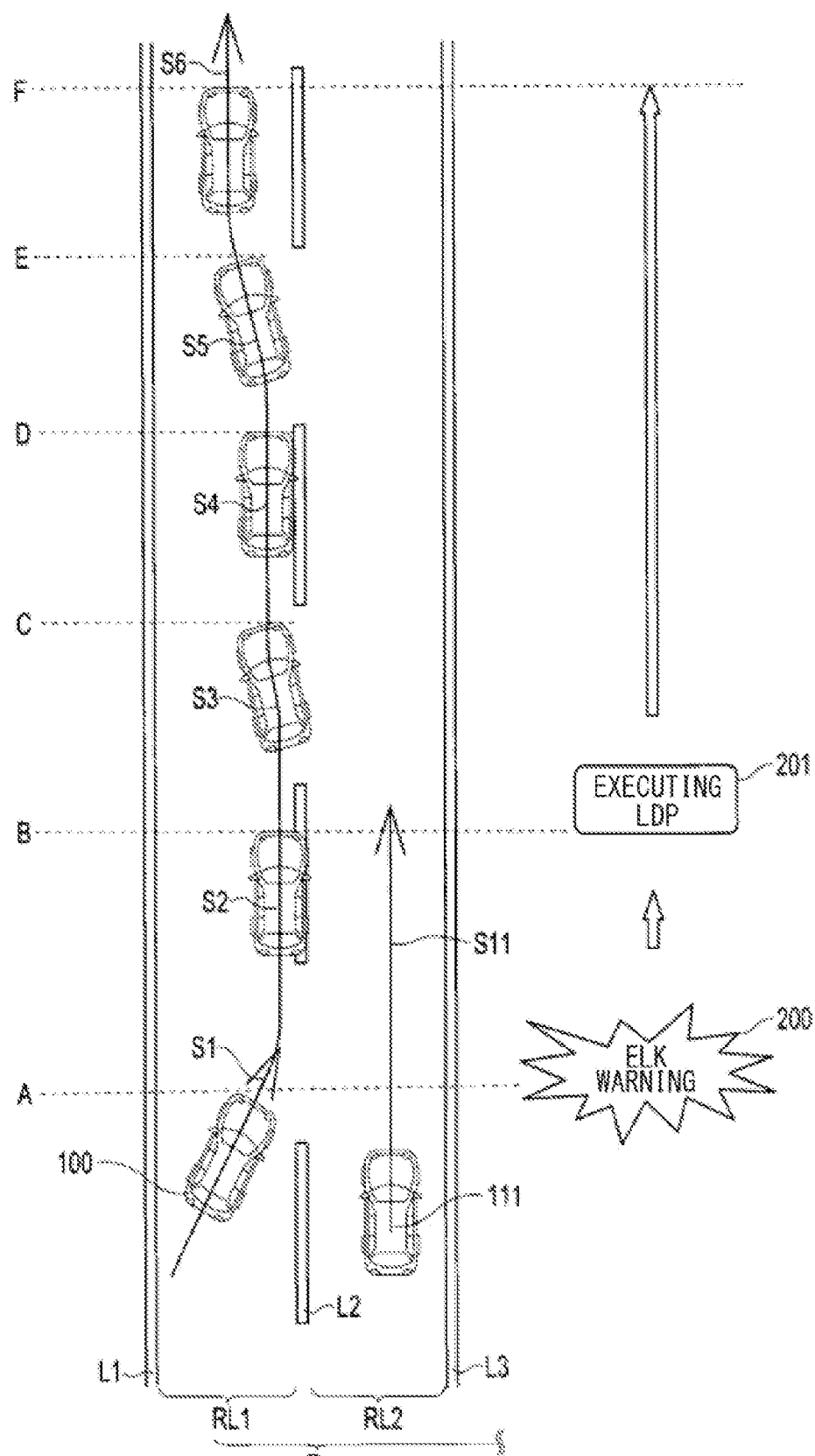
FIG. 4 is a diagram for describing another example of the working of the emergency lane keeping control to be performed by the drive assist apparatus according to the example embodiment, which is for a subsequent vehicle in the case of the first emergency lane keeping control.

For example, FIG. 4 is a diagram for describing another example of the working of the emergency lane keeping control to be performed by the drive assist apparatus 1 according to the example embodiment. This may be for a subsequent vehicle in the case of the first emergency lane keeping control.

FIG. 4 illustrates a case based on the assumption that: there is a four-lane road (i.e., a road having two lanes on each side); the own vehicle 100 is traveling on a left lane of the two lanes on one side of the road as a traveling lane; and the own vehicle 100 is to depart from the traveling lane into an adjacent lane on the right (i.e., a passing lane). Note that FIG. 4 illustrates only the two lanes on one side of the four-lane road.

The other example case illustrated in FIG. 4 is also based on the assumption that both the lane departure prevention control and the emergency lane keeping control are in the ON state (the first emergency lane keeping control).

The above-described control may be similarly applicable to the case illustrated in FIG. 4 where: the own vehicle 100 is traveling on a left lane RL1 of the two lanes on one side of the four-lane road as a traveling lane; the own vehicle 100 is to depart from the traveling lane into an adjacent lane on the right (i.e., a passing lane) which is a lane RL2; a subsequent vehicle 111 that is traveling on the adjacent lane on the right side (the lane RL2) as a traveling lane in a rear-side region of the own vehicle 100 along an arrow S11 representing a vector of its traveling direction and is approaching toward the own vehicle 100 is present; and the own vehicle 100 detects the subsequent vehicle 111.

Figure 5:
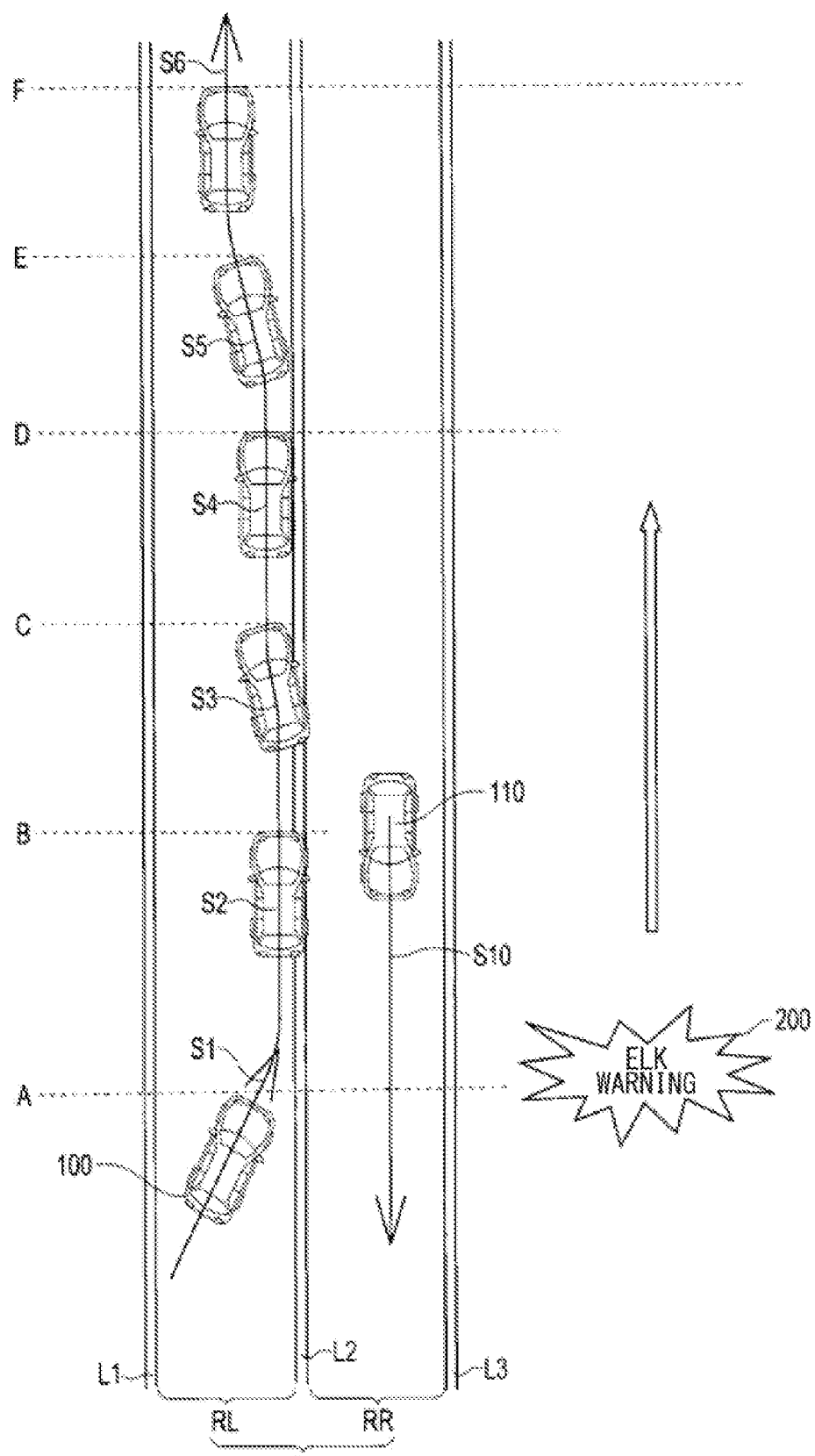
FIG. 5 is a diagram for describing still another example of the working of the emergency lane keeping control to be performed by the drive assist apparatus according to the example embodiment, which is for an oncoming vehicle in a case of a second emergency lane keeping control.

FIG. 5 is a diagram for describing still another example of the working of the emergency lane keeping control to be performed by the drive assist apparatus 1 according to the example embodiment. This may be for an oncoming vehicle in a case of a second emergency lane keeping control.

As with FIG. 3, FIG. 5 illustrates an example case based on the assumption that the own vehicle 100 is traveling in a region within the left lane RL of the two-lane shuttle-traffic road R. Therefore, FIG. 5 includes reference signs same as those in FIGS. 2 and 3.

In such a case, the own vehicle 100 may be traveling on the left lane RL as the traveling lane of the own vehicle, i.e., the own-vehicle traveling lane, and the oncoming vehicle 110 may be present on the right lane RR. The situation illustrated in FIG. 5 is similar to the situation illustrated in FIG. 3 in this point. However, in the example illustrated in FIG. 5, it is assumed that the lane departure prevention control among the steering assist controls of the drive assist apparatus 1 mounted on the own vehicle 100 is in the OFF state and only the emergency lane keeping control is set in the ON state, i.e., is set to be activated.

Hereinafter, a control to be performed in a case where the lane departure prevention control is in the OFF state and the emergency lane keeping control is in the ON state is referred to as the "second emergency lane keeping control". FIG. 5 illustrates an example case of detecting an oncoming vehicle in executing the second emergency lane keeping control. The following description referring to FIG. 5 is intended to describe a working of the second emergency lane keeping control (i.e., the control to be performed in the case where the lane departure prevention control is in the OFF state and the emergency lane keeping control is in the ON state), and therefore does not involve ON-OFF states of controls other than the second emergency lane keeping control, and interventions and influences thereof.

In such a situation, the drive assist apparatus 1 of the own vehicle 100 may recognize the lane lines L1 and L2 on both sides of the own-vehicle traveling lane. Further, the drive assist apparatus 1 may set the lane RL in the region between the recognized lane lines L1 and L2 as a traveling lane on which the own vehicle 100 is to travel. Further, the drive assist apparatus 1 may set, for example, the lane middle position as a target traveling position of the own vehicle 100 within the set traveling lane, i.e., the lane RL. This may be a situation similar to that described with reference to FIGS. 2 and 3.

Here, as in the cases illustrated in FIGS. 2 and 3, assume a case where the own vehicle 100 is to depart from the traveling lane (i.e., the lane RL) into the adjacent lane (i.e., the lane RR) which is the oncoming lane in the example illustrated in FIG. 5. In this case, further assume that the own vehicle 100 is present at the position A in FIG. 5 and has a posture illustrated in FIG. 5.

In such a situation, the own vehicle 100 present at the position A in FIG. 5 may be in a situation where a line that is along a front-rear direction of the own vehicle 100 and is along a vector (the arrow S1) of the traveling direction of the own vehicle 100 at this timing (i.e., at the position A) has an inclination of a predetermined angle with respect to the lane lines L1 and L2 on both sides of the traveling lane (i.e., the lane RL) of the own vehicle 100. Therefore, if the own vehicle 100 travels along the arrow S1 which is the vector of the traveling direction of the own vehicle 100 without changing the traveling direction, it can be predicted that the own vehicle 100 crosses the lane line L2 and thereafter departs into the adjacent lane RR, i.e., the oncoming lane. Such determination may be performed by the lane departure determination section 22g.

However, in this case, the lane departure prevention control of the drive assist apparatus 1 may be in the OFF state. Therefore, even if the lane departure of the own vehicle 100 is determined as described above, the drive assist apparatus 1 may refrain from starting the lane departure prevention control. In this case, the driver may perform an operation on the steering wheel in accordance with his or her intention to prevent departure of the own vehicle 100 from the lane.

In such a situation, assume that: an oncoming vehicle 110 is present at a position that is within the oncoming lane (i.e., the lane RR) and is on a frontward extension of the line along the front-rear direction of the own vehicle 100 (i.e., the line along the arrow S1); and the oncoming vehicle 110 is traveling in a direction along the arrow S10 in FIG. 5. Further, the drive assist apparatus 1 of the own vehicle 100 may detect the oncoming vehicle 110, for example, with the use of the camera unit 21. Accordingly, the drive assist apparatus 1 may start the emergency lane keeping control using the detection of the oncoming vehicle 110 as a trigger therefor.

In a case where the drive assist apparatus 1 detects the oncoming vehicle 110 and thereby starts the emergency lane keeping control, the drive assist apparatus 1 may first perform the warning presentation 200 illustrated in FIG. 5. The warning presentation 200 may be performed to alert the occupant such as the driver to another vehicle such as an oncoming vehicle. Non-limiting examples of the warning presentation 200 may include a visual presentation on a device such as a display panel and an audio presentation with a device such as a speaker. The drive assist apparatus 1 may continue to perform the warning presentation 200 until the emergency lane keeping control is completed.

In this example, the execution of the emergency lane keeping control may be triggered by the detection of the oncoming vehicle 110, and a predetermined steering assist control may be performed together with the warning presentation 200. The own vehicle 100 may thereby travel from the position A, pass the positions B and C, and arrive at the position D illustrated in FIG. 5. At the position D illustrated in FIG. 5, the own vehicle 100 may be brought to a state: where the line along the front-rear direction of the own vehicle 100 (i.e., a line along the arrow S4) and the lane line L2 is parallel to each other; and where the own vehicle 100 is traveling while maintaining its position at the lane end position within the traveling lane. Thereafter, the drive assist apparatus 1 may continue to cause the own vehicle 100 to travel along the lane line L2 while maintaining the above-described state until a predetermined time period elapses.

In this period, in a case where the own vehicle 100 and the oncoming vehicle 110 triggered the execution of the above-described emergency lane keeping control pass each other, where the oncoming vehicle 110 travels away from around the own vehicle 100 and becomes absent around the own vehicle 100, and where another oncoming vehicle subsequent to the oncoming vehicle 110 is not present (i.e., no subsequent oncoming vehicle is detected), the drive assist apparatus 1 may end the emergency lane keeping control which is currently being executed at a timing when the own vehicle 100 becomes parallel to the lane line L2 and is brought to a state of traveling while maintaining its position at the lane end position within the traveling lane. The warning presentation 200 based on the emergency lane keeping control may be also ended at this timing.

Figure 6:
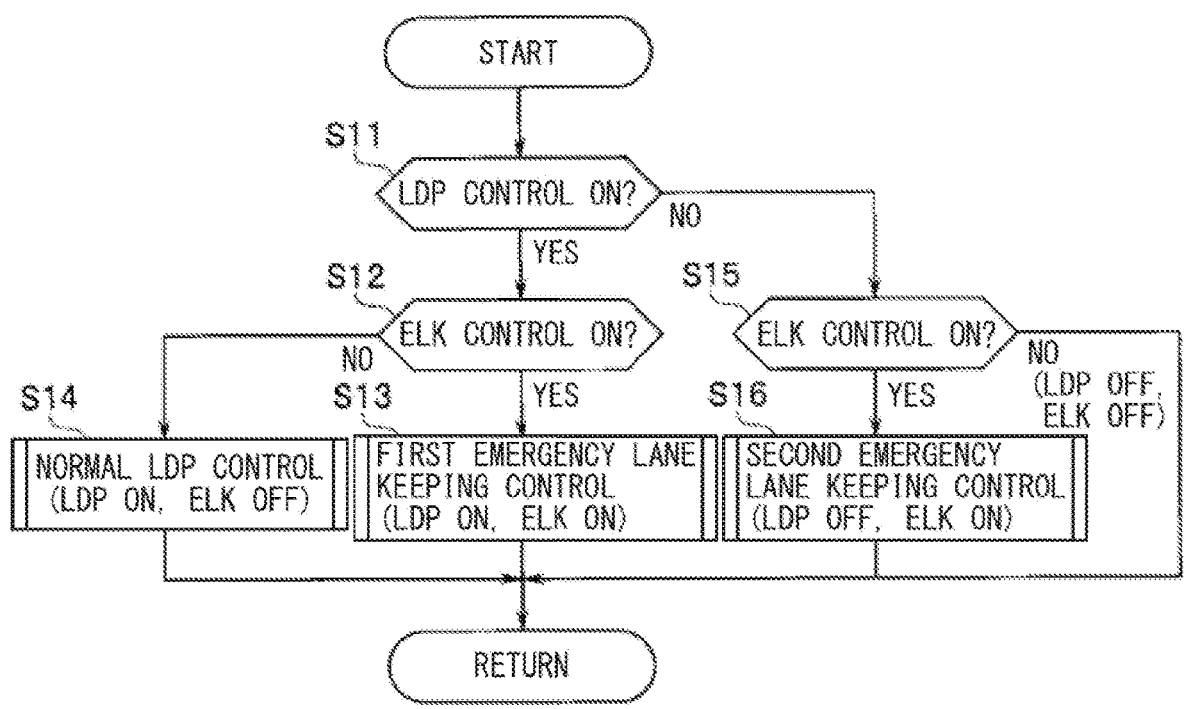
FIG. 6 is a flowchart illustrating an example of a lane departure prevention control and the emergency lane keeping control to be performed by the drive assist apparatus according to the example embodiment.
Figure 7:
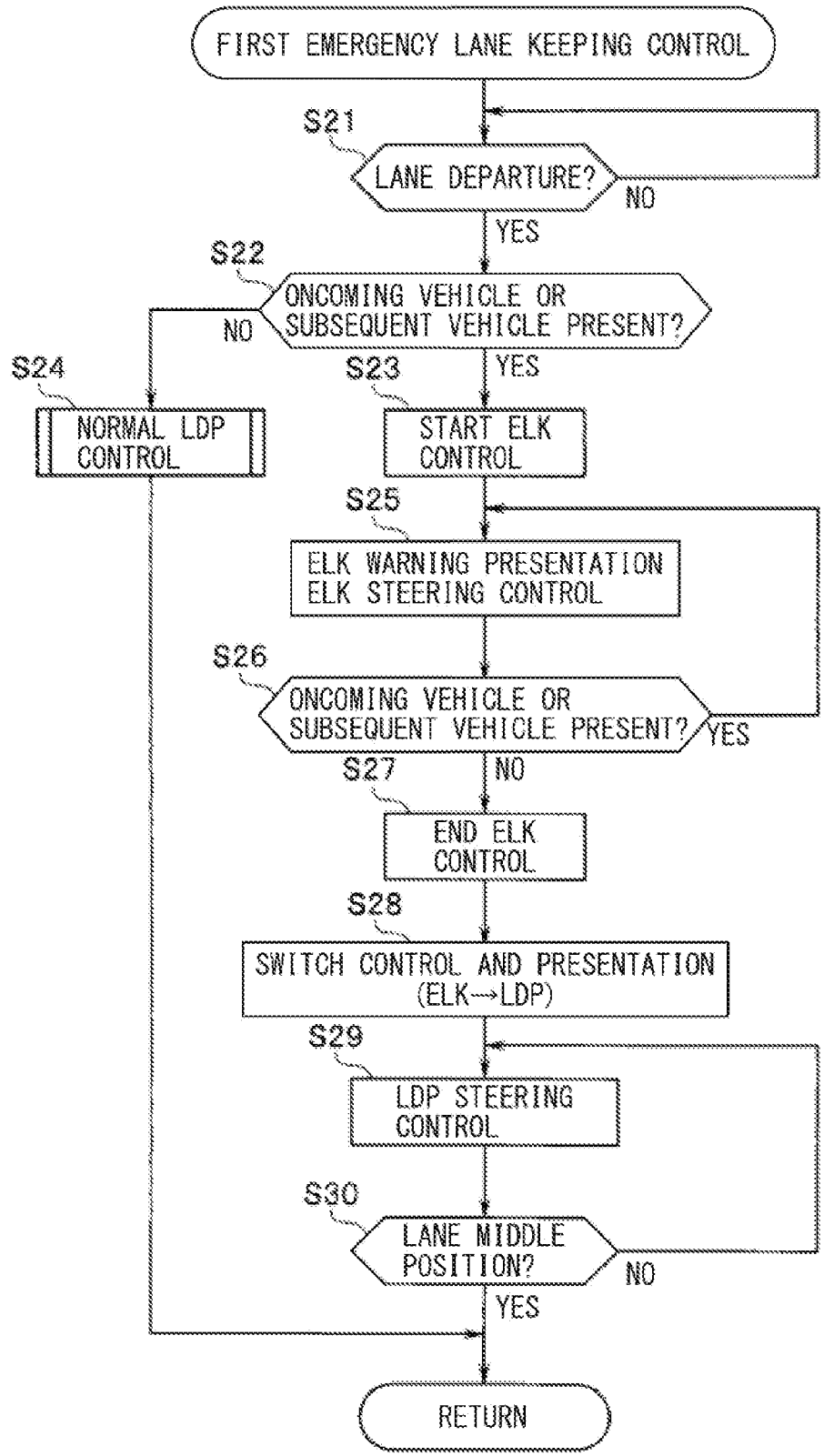
FIG. 7 is a flowchart illustrating an example of a subroutine of the first emergency lane keeping control (i.e., a process in step S13) in FIG. 6.
Figure 8:
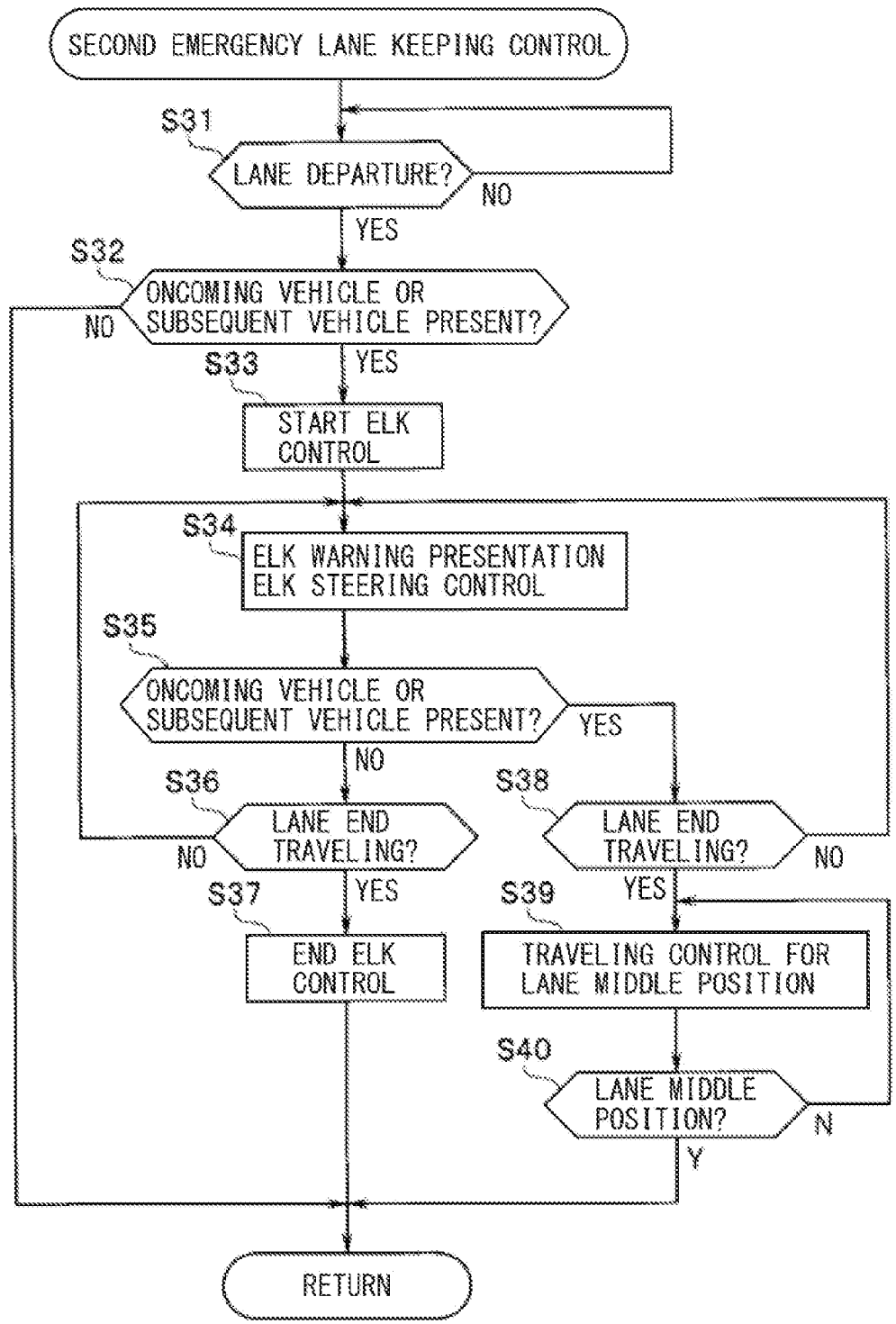
FIG. 8 is a flowchart illustrating an example of a subroutine of the second emergency lane keeping control (i.e., a process in step S16) in FIG. 6.

Next, a description is given of a working of the emergency lane keeping control to be performed by the drive assist apparatus 1 according to the example embodiment with reference to FIGS. 6 to 8.

FIG. 6 is a flowchart illustrating details of an example of the lane departure prevention control and the emergency lane keeping control to be performed by the drive assist apparatus 1 according to the example embodiment. FIG. 7 is a flowchart illustrating an example of a sub-routine of the first emergency lane keeping control, i.e., a process in step S13, illustrated in FIG. 6. FIG. 8 is a flowchart illustrating an example of a sub-routine of the second emergency lane keeping control, i.e., a process in step S16, illustrated in FIG. 6.

First, in step S11 in FIG. 6, the traveling control unit 22 may confirm whether the lane departure prevention control is set in the ON state. In a case where the lane departure prevention control is confirmed as being set in the ON state (YES in step S11), the process may be caused to proceed to step S12. In a case where the lane departure prevention control is confirmed as being set in the OFF state (NO in step S11), the process may be caused to proceed to step S15.

In step S12, the traveling control unit 22 may confirm whether the emergency lane keeping control is set in the ON state. In a case where the emergency lane keeping control is confirmed as being set in the ON state (YES in step S12), the process may be caused to proceed to step S13. In a case where the emergency lane keeping control is confirmed as being set in the OFF state (NO in step S12), the process may be caused to proceed to step S14.

In step S13, it may have been confirmed that both the lane departure prevention control and the emergency lane keeping control are in the ON state. Therefore, in step S13, the traveling control unit 22 may execute the first emergency lane keeping control. After the process of the first emergency lane keeping control is completed, the process may be caused to return to an unillustrated main sequence that has been performed previously.

In step S14, it may have been confirmed that the lane departure prevention control is in the ON state and the emergency lane keeping control is in the OFF state. Therefore, in step S14, the traveling control unit 22 may execute the normal lane departure prevention control illustrated in FIG. 2. After the process of the normal lane departure prevention control is completed, the process may be caused to return to an unillustrated main sequence that has been performed previously.

In step S15, the traveling control unit 22 may confirm whether the emergency lane keeping control is set in the ON state. In a case where the emergency lane keeping control is confirmed as being set in the ON state (YES in step S15), the process may be caused to proceed to step S16. In a case where the emergency lane keeping control is confirmed as being set in the OFF state (NO in step S15), both the lane departure prevention control and the emergency lane keeping control are in the OFF state. Accordingly, in this case, the process may be caused to return to an unillustrated main sequence that has been performed previously.

In step S16, it may have been confirmed that the lane departure prevention control is in the OFF state and the emergency lane keeping control is in the ON state. Therefore, in step S16, the traveling control unit 22 may execute the second emergency lane keeping control. After the process of the second emergency lane keeping control is completed, the process may be caused to return to an unillustrated main sequence that has been performed previously.

Next, a description is given below of the above-described process in step S13 illustrated in FIG. 6, i.e., the first emergency lane keeping control, with reference to the sub-routine illustrated in FIG. 7.

First, in step S21 illustrated in FIG. 7, the traveling control unit 22 or the lane departure determination section 22g may determine whether the own vehicle 100 is to depart from the traveling lane on which the own vehicle 100 is traveling. In a case where the own vehicle 100 is determined as being to depart from the traveling lane (YES in step S21), the process may be caused to proceed to step S22. In a case where the own vehicle 100 is determined as not being to depart from the traveling lane (NO in step S21), the traveling control unit 22 or the lane departure determination section 22g may repeatedly perform this determination process until the own vehicle 100 is determined as being to depart from the traveling lane.

In step S22, the traveling control unit 22 or the surrounding situation determination processor 22a may confirm whether another vehicle such as an oncoming vehicle or a subsequent vehicle traveling around the own vehicle 100 is present. In a case where another vehicle such as the oncoming vehicle or the subsequent vehicle is detected (YES in step S22), the process may be caused to proceed to step S23. In a case where another vehicle such as the oncoming vehicle or the subsequent vehicle is not detected (NO in step S22), the process may be caused to proceed to step S24.

In step S24, the traveling control unit 22 may execute the normal lane departure prevention control illustrated in FIG. 2. After the process of the normal lane departure prevention control is completed, the process may be caused to return to an unillustrated main sequence that has been performed previously.

In step S23, the traveling control unit 22 may start the emergency lane keeping control.

Thereafter, in step S25, the traveling control unit 22 may perform a predetermined warning presentation 200, and may also execute a predetermined steering control based on the emergency lane keeping control together with the predetermined warning presentation 200. In the process in step S25, the traveling control unit 22 may cause the own vehicle 100 to move from the position A to the position B illustrated in FIG. 3, and allow the line along the front-rear direction of the own vehicle 100 and the lane line L2 to be parallel to each other. Further, the traveling control unit 22 may perform a control process that causes the own vehicle 100 to travel for a predetermined time period while maintaining the above-described state.

Thereafter, in step 26, the traveling control unit 22 may confirm again whether another vehicle such as an oncoming vehicle or a subsequent vehicle traveling around the own vehicle 100 is present. In a case where another vehicle such as the oncoming vehicle or the subsequent vehicle is detected (YES in step S26), the process may be caused to return to step S25 described above. In a case where another vehicle such as the oncoming vehicle or the subsequent vehicle is not detected (NO in step S26), the process may be caused to proceed to step S27.

In step S27, the traveling control unit 22 may end the emergency lane keeping control.

Thereafter, in step S28, the traveling control unit 22 may switch the control from the emergency lane keeping control to the lane departure prevention control, and also switch presentation from the warning presentation 200 to the state presentation 201.

Thereafter, in step S29, the traveling control unit 22 may execute a steering control based on the lane departure prevention control that has been executed from the end timing of the emergency lane keeping control described above. The steering control to be performed here may be a control of taking over the predetermined steering control based on the emergency lane keeping control started in the above-described process in step S25. Therefore, the traveling control unit 22 may continue to perform a steering control similar thereto.

Thereafter, in step S30, the traveling control unit 22 may confirm whether a state in which the own vehicle 100 is traveling while maintaining its position at the lane middle position of the traveling lane is achieved. In a case where the state in which the own vehicle 100 is traveling while maintaining its position at the lane middle position of the traveling lane is not confirmed (NO in step S30), the process may be caused to return to step S29. In a case where the state in which the own vehicle 100 is traveling while maintaining its position of the traveling lane at the lane middle position is confirmed (YES in step S30), the traveling control unit 22 may end the series of controls and may cause the process to return to an unillustrated main sequence that has been performed previously.

Next, a description is given below of the above-described process in step S16 in FIG. 6, i.e., the second emergency lane keeping control, with reference to the sub-routine illustrated in FIG. 8.

First, in step S31 in FIG. 8, the traveling control unit 22 or the lane departure determination section 22g may determine whether the own vehicle 100 is to depart from the traveling lane on which the own vehicle 100 is traveling. The process in step S31 may be similar to that in step S21 in FIG. 7. In a case where the own vehicle 100 is determined as being to depart from the traveling lane (YES in step S31), the process may be caused to proceed to step S32. In a case where the own vehicle 100 is determined as not being to depart from the traveling lane (NO in step S31), the traveling control unit 22 or the lane departure determination section 22g may repeatedly perform this determination process until the own vehicle 100 is determined as being to depart from the traveling lane.

In step S32, the traveling control unit 22 or the surrounding situation determination processor 22a may confirm whether another vehicle such as an oncoming vehicle or a subsequent vehicle traveling around the own vehicle 100 is present. The process in step S32 may be similar to that in step S22 in FIG. 7. In a case where another vehicle such as the oncoming vehicle or the subsequent vehicle is detected (YES in step S32), the process may be caused to proceed to step S33. In a case where another vehicle such as the oncoming vehicle or the subsequent vehicle is not detected (NO in step S32), the process may be caused to return to an unillustrated main sequence that has been performed previously.

In step S33, the traveling control unit 22 may start the emergency lane keeping control.

Thereafter, in step S34, the traveling control unit 22 may perform a predetermined warning presentation 200, and may also execute a steering control based on the emergency lane keeping control together with the predetermined warning presentation 200. In the process in step S34, the traveling control unit 22 may cause the own vehicle 100 to move from the position A to the position D illustrated in FIG. 5, and allow the line along the front-rear direction of the own vehicle 100 and the lane line L2 to be parallel to each other. In the process in step S34, the traveling control unit 22 may further perform a control process that causes the own vehicle 100 to travel for a predetermined time period while maintaining the above-described state.

Thereafter, in step 35, the traveling control unit 22 may confirm again whether another vehicle such as an oncoming vehicle or a subsequent vehicle traveling around the own vehicle 100 is present. In a case where another vehicle such as the oncoming vehicle or the subsequent vehicle is detected (YES in step S35), the process may be caused to proceed to step S38. In a case where another vehicle such as the oncoming vehicle or the subsequent vehicle is not detected (NO in step S35), the process may be caused to proceed to step S36.

In step S36, the traveling control unit 22 may confirm whether the own vehicle 100 is brought to a state of traveling along the lane end of the traveling lane. In a case where the state of traveling along the lane end is confirmed (YES in step S36), the process may be caused to proceed to step S37. In a case where the state of traveling along the lane end is not confirmed (NO in step S36), the process may be caused to return to step S34 described above.

Thereafter, in step S37, the traveling control unit 22 may end the emergency lane keeping control. Here, the traveling control unit 22 may also end the warning presentation 200 based on the emergency lane keeping control. Thereafter, the process may be caused to return to a sequence that has been performed previously.

In a case where another vehicle such as the oncoming vehicle or the subsequent vehicle traveling around the own vehicle 100 has been detected again in the process in step S35 and the process has been caused to proceed to step S38, the traveling control unit 22 may confirm, in step S38, whether the own vehicle 100 is brought to the state of traveling along the lane end of the traveling lane. In a case where the state of traveling along the lane end of the traveling lane is detected (YES in step S38), the process may be caused to proceed to step S39. In a case where the state of traveling along the lane end of the traveling lane is not detected (NO in step S38), the process may be caused to return to step S34 described above.

Thereafter, in step S39, the traveling control unit 22 may perform a traveling control for causing the own vehicle 100 to continue to travel while maintaining its position at the lane middle position of the traveling lane.

Thereafter, in step S40, the traveling control unit 22 may confirm whether the own vehicle 100 is in a state of traveling while maintaining its position at the lane middle position of the traveling lane. In a case where the state in which the own vehicle 100 is traveling while maintaining its position at the lane middle position is not confirmed (NO in step S40), the process may be caused to return to step S39. In a case where the state in which the own vehicle 100 is traveling while maintaining its position at the lane middle position is confirmed (YES in step S40), the traveling control unit 22 may end the series of controls and the process may be caused to return to an unillustrated main sequence that has been performed previously.

As described above, according to the drive assist apparatus 1 of the example embodiment, the traveling control unit 22 may execute the lane departure prevention control which is the traveling control for emergency in a case where the results of the determinations performed by the surrounding situation determination processor 22a and the steering-wheel holding state determination processor 22b indicate a state where the own vehicle 100 is unable to maintain normal traveling, and where a predetermined setting is selected. Non-limiting example of the state in which the own vehicle 100 in unable to maintain the normal traveling may include a case where the own vehicle 100 is to depart from a lane on which the own vehicle 100 is traveling. Non-limiting examples of the predetermined setting may include the ON state. In the above-described case, if another vehicle such as an oncoming vehicle or a subsequent vehicle is present on a lane adjacent to the traveling lane of the own vehicle 100, the traveling control unit 22 may execute the emergency lane keeping control.

Further, in a case where both the lane departure prevention control and the emergency lane keeping control are set in the activated state, the steering assist control processor 22d may switch the control from the emergency lane keeping control to the lane departure prevention control at a timing when the own vehicle 100 is brought to a state of traveling along the lane line of the set traveling lane without crossing the lane line. The steering assist control processor 22d may thereby execute the first emergency lane keeping control that performs a traveling control of causing the traveling position of the own vehicle 100 to return from the position at which the own vehicle 100 is prevented from crossing the lane line of the set traveling lane to the target traveling position.

In a case where the lane departure prevention control is in the non-activated state and the emergency lane keeping control is in the activated state, the steering assist control processor 22d may bring the own vehicle 100 to the state of traveling along the lane line of the set traveling lane without crossing the lane line. Thereafter, at a timing when the own vehicle 100 is brought to the state of traveling along the lane end within the set traveling lane, the steering assist control processor 22d may execute the second emergency lane keeping control of ending the emergency lane keeping control.

Note that the timing when the steering assist control processor 22d switches the control from the emergency lane keeping control (the ELK control) to the lane departure prevention control (the LDP control) may be set to a timing when the vector of the traveling direction of the own vehicle 100 and the lane line of the traveling lane become substantially parallel to each other.

With such a configuration, the drive assist apparatus 1 according to the example embodiment may have the first emergency lane keeping control and the second emergency lane keeping control for the emergency lane keeping control in a case where another vehicle such as an oncoming vehicle or a subsequent vehicle is recognized on a lane adjacent to the traveling lane of the own vehicle 100. The first emergency lane keeping control may be performed in a case where both the lane departure prevention control and the emergency lane keeping control are in the ON state. The second emergency lane keeping control may be performed in a case where the lane departure prevention control is in the OFF state and the emergency lane keeping control is in the ON state. In each of the first emergency lane keeping control and the second emergency lane keeping control, a control substantially similar to the normal lane departure prevention control may be performed, but the warning presentation, which is to be continuously performed in the normal emergency lane keeping control, may be canceled at a predetermined timing.

Accordingly, in a case where the steering assist control is performed by combining the lane departure prevention control and the emergency lane keeping control, appropriately changing the timing to switch the control process to be executed in accordance with the ON-OFF setting of each of the controls makes it possible to constantly execute a more natural and smoother steering assist control without giving a sense of annoyance or strangeness to the driver.

The drive assist apparatus 1 according to the example embodiment may be configured to perform steering-wheel holding state determination operation. The steering-wheel holding state determination operation may be operation of detecting a state in which the driver is holding the steering wheel, which is referred to as the "steering-wheel holding state", while the own vehicle is traveling, to determine the steering-wheel holding state, i.e., the state in which the driver is holding the steering wheel. The steering-wheel holding state determination operation may be achieved by the steering-wheel holding state recognizer, i.e., the steering-wheel touch sensor 34 and the steering torque sensor 35, and processors including, without limitation, the steering-wheel holding state determination processor 22b of the traveling control unit 22.

When the vehicle is traveling, the steering-wheel holding state recognizer, i.e., the steering-wheel touch sensor 34 and the steering torque sensor 35, may constantly monitor the state in which the driver is holding the steering wheel, i.e., the steering-wheel holding state, and the steering-wheel holding state determination processor 22b may determine the steering-wheel holding state on the basis of an output signal supplied from the steering-wheel holding state recognizer, i.e., the steering-wheel touch sensor 34 and the steering torque sensor 35.

For example, in a case where a situation without detection of the steering-wheel holding state continues for a predetermined time period or while the own vehicle 100 travels a predetermined distance, a predetermined warning presentation may be performed. Non-limiting examples of the predetermined time period may include 15 seconds. Non-limiting examples of the predetermined warning presentation may include a visual warning presentation and an audio warning presentation. Further, in a case where a state in which the driver's hand is away from the steering wheel continues for a predetermined time period or while the own vehicle 100 travels a predetermined distance thereafter, a control of canceling the steering assist control that is currently being executed may be performed. Non-limiting examples of the predetermined time period may include 50 seconds.

In this case, the drive assist apparatus 1 may determine, for example, that some kind of abnormality which makes it difficult for the driver to perform the driving operation is occurring, and execute a so-called control for driver abnormality. Non-limiting examples of the abnormality which makes it difficult for the driver to perform the driving operation may include: malfunction of the own vehicle 100 and a low conscious state of the driver due to a sudden illness or drowsiness of the driver.

Figure 9:
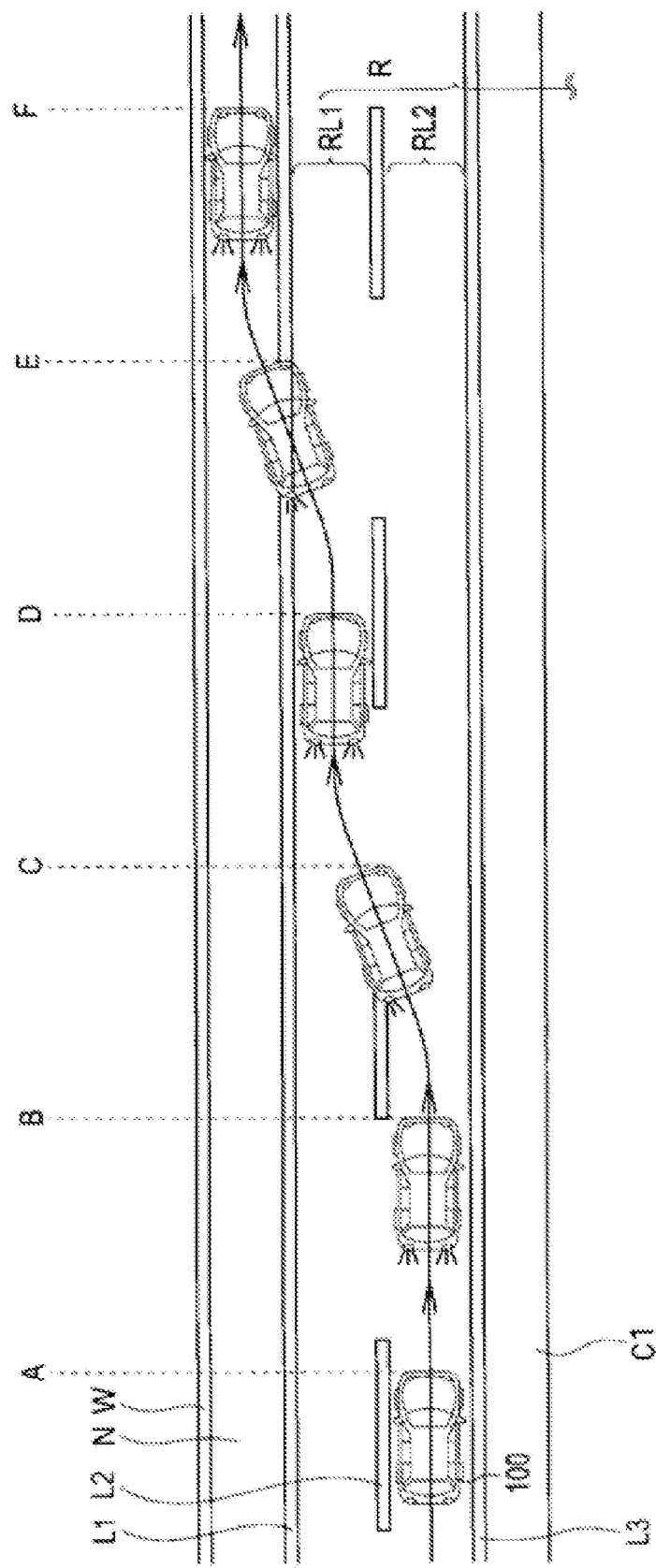
FIG. 9 is a diagram for schematically describing a working of a control for driver abnormality to be performed by the drive assist apparatus according to the example embodiment.

Now, a brief description is given below of a basic working of the control for driver abnormality with reference to FIG. 9. FIG. 9 schematically describes a working of the control for driver abnormality to be performed by the drive assist apparatus 1 according to the example embodiment. The basic working of the control for driver abnormality to be performed by the drive assist apparatus 1 according to the example embodiment may be substantially similar to that of an existing control for driver abnormality. However, the control for driver abnormality to be performed by the drive assist apparatus 1 according to the example embodiment may be devised in determining the steering-wheel holding state as compared with the existing control. Details thereof are described later.

FIG. 9 illustrates an example case based on the assumption that: there is an arterial road R, such as an expressway, that has four lanes and a median strip; and the own vehicle 100 is traveling in a region within a right lane RL2 of the two lanes on one side, i.e., a passing lane, as a traveling lane.

The road R is a left lane RL1 on the left when viewed from the driver of the own vehicle 100, the right lane RL2 on the right, and a roadside strip N on the left. The left lane RL1 is a region between a lane line L1 on the left road shoulder side and a lane line L2 at the middle. The right lane RL2 is a region between the lane line L2 at the middle and a lane line L3 on the right road shoulder side. Further, the roadside strip N on the left is a region between the lane line L1 on the left road shoulder side and an object W such as a guardrail or a sidewall. The object W such as a guardrail or a sidewall is hereinafter simply referred to as an "object W such as a sidewall". Note that a median strip C1 is provided outside the lane line L3 on the right road shoulder side, i.e., on the right when viewed from the driver of the own vehicle 100, for example, with an unillustrated guardrail therebetween.

In this case, the own vehicle 100 is traveling on the right lane RL2 as the own-vehicle traveling lane, as described above. Further, assume that the own vehicle 100 is traveling while the drive assist apparatus 1 mounted on the own vehicle 100 is executing various steering assist controls including, without limitation, the lane keep assist control, the lane departure prevention control, and the emergency lane keeping control.

Assume that, in such a situation, the drive assist apparatus 1 of the own vehicle 100 has continuously performed the steering-wheel holding state determination operation but has not detected the steering-wheel holding state for a predetermined time period, and a predetermined time period has elapsed without detection of the steering-wheel holding state even though the drive assist apparatus 1 has performed a predetermined warning presentation. Non-limiting examples of the predetermined warning presentation may include a visual warning presentation and an audio warning presentation. In such a case, the drive assist apparatus 1 may determine that the driver is in an abnormal state or the like (abnormality detection).

In this case, the drive assist apparatus 1 may first perform a predetermined notification for the driver prior to starting the control for driver abnormality.

Non-limiting examples of the notification for the driver may include a visual warning presentation and an audio warning presentation. Non-limiting examples of the visual warning presentation may include: turning on a lamp of a predetermined activation switch in an instrument panel viewable from the driver; a notification presentation prompting the driver to hold the steering wheel; and a notification presentation notifying the occupant such as the driver of the start of the control for driver abnormality. Such visual warning presentations may be performed with use of a device such as a display panel. Non-limiting examples of the audio warning presentation may include: a notification prompting the driver to hold the steering wheel; and a notification presentation notifying the occupant such as the driver of the start of the control for driver abnormality. Such audio warning presentations may be performed by means of, for example, an audio announcement.

After such a notification is performed, if the driver shows no response to the notification, the drive assist apparatus 1 may cancel the steering assist control that is currently being executed, and also start executing the control for driver abnormality. Non-limiting examples of the response of the driver to the notification may include: performing an operation of holding the steering-wheel; and an operation of canceling the start of the control for driver abnormality.

Note that the "notification for the driver" has been described above; however, the target of the notification performed in the "notification for the driver" is not limited to the driver and may include any other occupant such as a passenger in the own vehicle 100. The "notification for the driver" may further include "notification for an occupant such as a driver of another vehicle outside the own vehicle".

Non-limiting examples of "notification for the passenger" may include a visual warning presentation and an audio warning presentation, as with the above-described "notification for the driver".

Non-limiting examples of the "notification for the occupant such as the driver of another vehicle outside the own vehicle" may include flashing of a hazard lamp, flashing of a signal light at the time of a lane change. In a case where a braking control is performed, a brake lamp may be turned on, for example. As described above, various behaviors to notify the outside of the behavior of the own vehicle 100 may be achieved independently of the operation performed by the driver.

As described above, the control for driver abnormality by the drive assist apparatus 1 may be started on the basis of detection of, for example, the abnormal state of the driver. In this case, the abnormal state of the driver may be determined on the basis of, for example, whether a steering-wheel non-holding state has continued for a predetermined time period or more, or whether the own vehicle has been traveling with the steering-wheel non-holding state for a predetermined distance or more.

Assume that the abnormal state or the like of the driver is detected when the own vehicle 100 is present at the position A in FIG. 9. In a case of executing the control for driver abnormality, the drive assist apparatus 1 may first perform a control of: causing the own vehicle 100 to retreat from the position A in FIG. 9 to a location such as a location within a region on a left road shoulder eventually; and thereafter causing the own vehicle 100 to stop, for example, at the position F in FIG. 9. Details of this control may be as follows.

(1) The abnormal state or the like of the driver is detected when the own vehicle 100 is present at the position A in FIG. 9.

(2) The drive assist apparatus 1 may cause the own vehicle 100 to travel within the own-vehicle traveling lane as it is. For example, the drive assist apparatus 1 may perform the following.
  (a) The drive assist apparatus 1 may cause the hazard lamp to flash, and thereby perform the notification for the outside.
  (b) The drive assist apparatus 1 may perform speed adjustment within a range having an upper limit of a predetermined speed (e.g., 50 km/h), and also perform a steering control as appropriate in accordance with a road shape, to thereby cause the own vehicle 100 to continue traveling within the same lane. Non-limiting examples of the speed adjustment may include a deceleration control based on an engine control and a braking control. The deceleration control in this case may be a deceleration control without suppression of acceleration, i.e., a braking control that accepts an input performed by means of an accelerator.

(3) Thereafter, the drive assist apparatus 1 may cause the own vehicle 100 to perform a lane change to thereby cause the own vehicle 100 to move toward the road shoulder side. For example, in a case where the own vehicle 100 is traveling on a lane near the middle of the four-lane road as illustrated in FIG. 9, the drive assist apparatus 1 may perform a predetermined steering control to cause the own vehicle 100 to perform a lane change into the left lane RL1. The drive assist apparatus 1 may thereby cause the own vehicle 100 to move from the position B to the position D via the position C in FIG. 9. Upon such a lane change, the drive assist apparatus 1 may cancel the flashing of the hazard lamp and cause the left signal light to flash.

(4) When the own vehicle 100 moves to the position D in FIG. 9 and the traveling of the own vehicle 100 within the region of the left lane RL1 is secured, the drive assist apparatus 1 may cancel the flashing of the left signal light, again cause the hazard lamp to flash, and maintain the traveling of the own vehicle 100 within the region of the left lane RL1.

(5) The drive assist apparatus 1 may perform a braking control to cause the own vehicle 100 to move toward the road shoulder side, and cause the own vehicle 100 to decelerate to a predetermined speed (e.g., 10 km/h). The deceleration control in this case may be a deceleration control with the suppression of acceleration, i.e., a braking control that does not accept the input performed by means of the accelerator.

(6) The drive assist apparatus 1 may perform a steering control to cause the own vehicle 100 to move toward the road shoulder side. This steering control may be similar to the control performed upon the lane change. That is, the drive assist apparatus 1 may cancel the flashing of the hazard lamp, cause the left signal light to flash, and perform a predetermined steering control to cause the own vehicle 100 to move from the left lane RL1 toward a location within a region of the roadside strip N. The drive assist apparatus 1 may thereby cause the own vehicle 100 to move from the position D to the location within the region of the roadside strip N via the position E in FIG. 9.

(7) When the traveling of the own vehicle 100 within the region of the roadside strip N is secured, the drive assist apparatus 1 may cancel the flashing of the left signal light, and again cause the hazard lamp to flash. Further, the drive assist apparatus 1 may perform a braking control while causing the own vehicle 100 to travel within the region of the roadside strip N. The drive assist apparatus 1 may thereby cause the own vehicle 100 to further decelerate and stop at a position (e.g., the position F in FIG. 9) at which a predetermined clearance is secured between the own vehicle 100 and the object W such as a sidewall. The deceleration control in this case may be a deceleration control with the suppression of acceleration.

(8) After the own vehicle 100 stops at the position F, the drive assist apparatus 1 may continue to perform the notification for the outside by a predetermined procedure until the control for driver abnormality is canceled. Non-limiting examples of the notification for the outside may include flashing of the hazard lamp and blaring of a horn.

Figure 10:
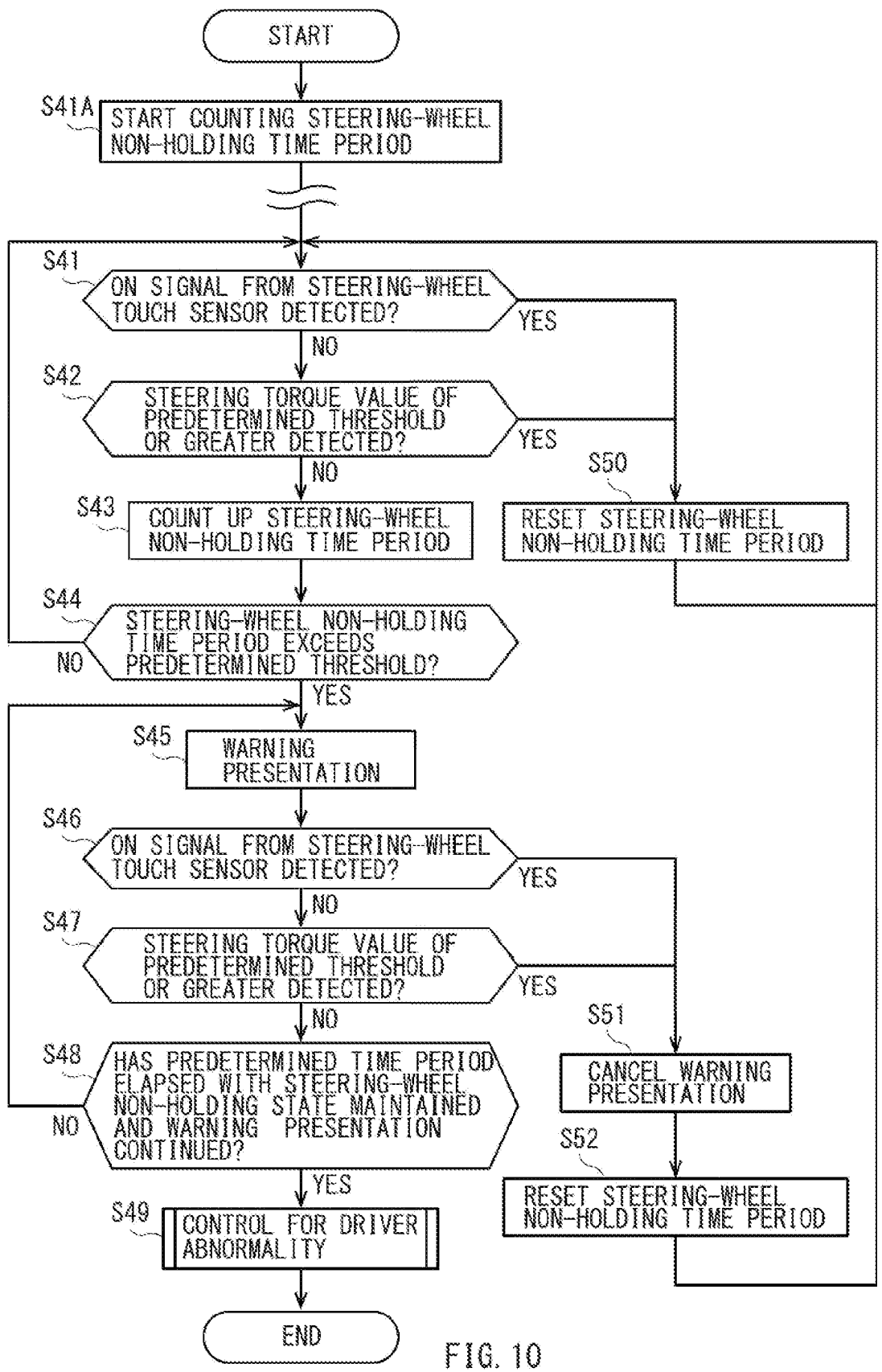
FIG. 10 is a flowchart for describing a timing to start the control for driver abnormality to be performed by the drive assist apparatus according to the example embodiment.
Figure 11:
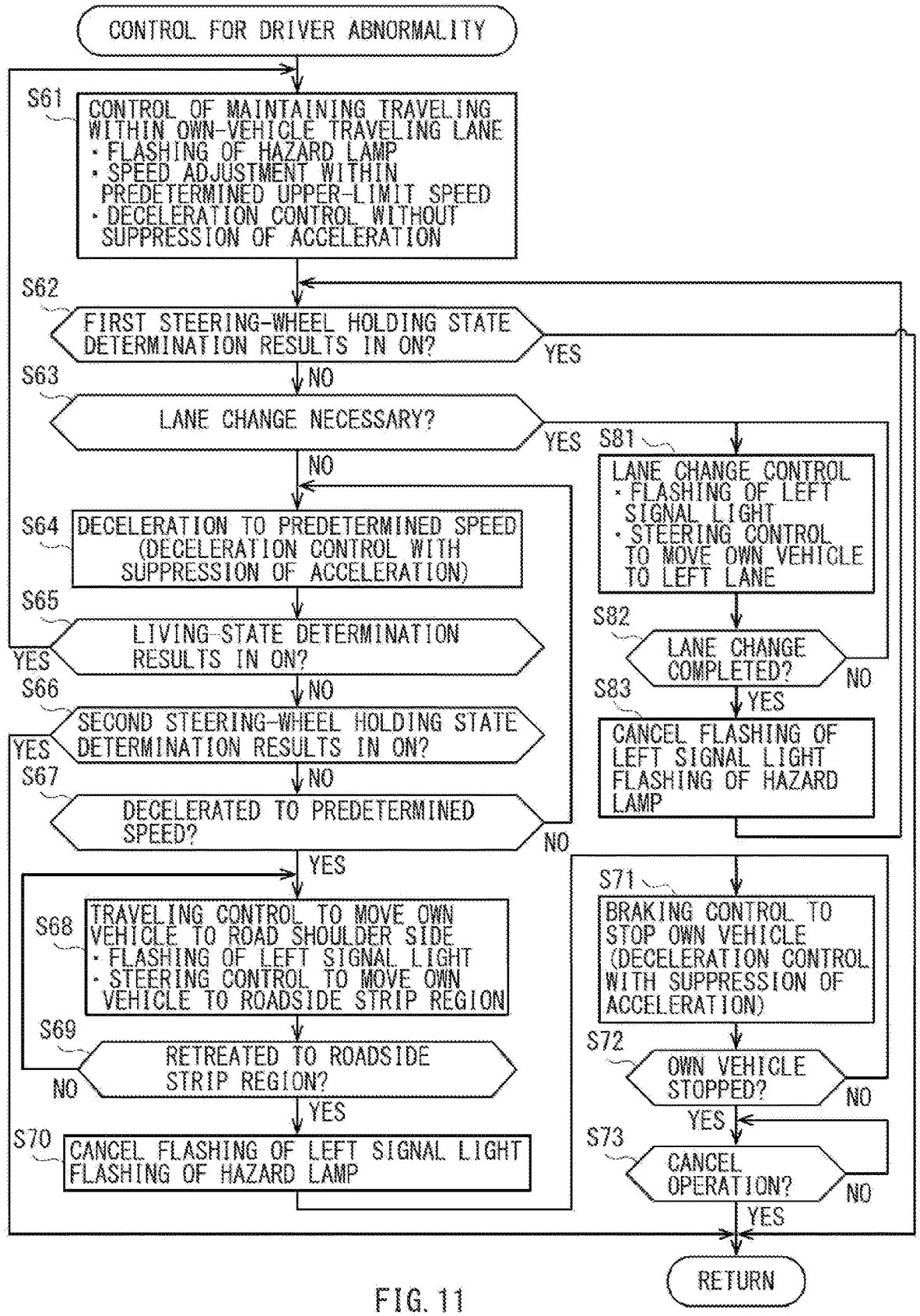
FIG. 11 is a flowchart illustrating details of an example of the control for driver abnormality (i.e., a process in step S49) in FIG. 10.

Next, a description is given of a working of the control for driver abnormality to be performed by the drive assist apparatus 1 according to the example embodiment with reference to FIGS. 10 and 11.

FIG. 10 is a flowchart for describing an example of a start timing of the control for driver abnormality to be performed by the drive assist apparatus 1 according to the example embodiment. FIG. 11 is a flowchart illustrating the control for driver abnormality, i.e., a process in step S47, described in FIG. 10.

In the drive assist apparatus 1 according to the example embodiment mounted on the own vehicle 100, when the traveling control unit 22 is activated to start a normal traveling control including the set steering assist control, first, in step S41A in FIG. 10, the traveling control unit 22 may start counting by means of a "steering-wheel non-holding time period counter" among unillustrated internal counters.

As used herein, the term "steering-wheel non-holding time period" refers to a time period in which a state in which the driver's hand is away from the steering wheel continues, i.e., a time period in which the steering-wheel holding state is not achieved. The unillustrated steering-wheel non-holding time period counter may count up a continuous time period during which the result of the steering-wheel holding state determination performed by the steering-wheel holding state determination processor 22b on the basis of the output signal from the steering-wheel holding state recognizer (i.e., the steering-wheel touch sensor 34 and the steering torque sensor 35) indicates the steering-wheel non-holding state.

In other words, the steering-wheel non-holding time period counter may count the time period during which a state without the output signal from the steering-wheel holding state recognizer (i.e., the steering-wheel touch sensor 34 and the steering torque sensor 35) continues. The drive assist apparatus 1 according to the example embodiment may continuously perform the counting of the steering-wheel non-holding time period from the timing when the traveling control unit 22 is activated and while the own vehicle 100 is traveling.

As used herein, the term "steering-wheel non-holding state" may refer to a state in which an interference on the steering device by the driver of the own vehicle 100 is not performed for a predetermined time period or while the own vehicle 100 travels a predetermined distance, and detection is not performed by the steering-wheel holding state recognizer (i.e., the steering-wheel touch sensor 34 or the steering torque sensor 35). Non-limiting examples of the interference on the steering device by the driver may include touching and holding of the steering wheel by the driver. In a case where such a steering-wheel non-holding state continues for a predetermined time period, the steering-wheel holding state determination processor 22b may determine that the steering-wheel non-holding state is occurring, and output a result of the determination indicating that the driver of the own vehicle 100 is unable to maintain normal traveling, as will be described later.

In a case where the own vehicle 100 is traveling in the above-described state, in step S41 in FIG. 10, the traveling control unit 22 may confirm whether an output signal (an ON signal) from the steering-wheel touch sensor 34 of the steering-wheel holding state recognizer has been detected. In a case where the ON signal from the steering-wheel touch sensor 34 is confirmed (YES in step S41), the traveling control unit 22 may determine that the steering-wheel holding state is achieved, and the process may be caused to proceed to step S50. In a case where the ON signal from the steering-wheel touch sensor 34 is not confirmed (NO in step S41), the traveling control unit 22 may determine that the steering-wheel non-holding state is occurring, and the process may be caused to proceed to step S42.

In step S42, the traveling control unit 22 may confirm whether a steering torque value detected by the steering torque sensor 35 of the steering-wheel holding state recognizer is a predetermined threshold or greater. In a case where the steering torque value detected by the steering torque sensor 35 is confirmed as being the predetermined threshold or greater (YES in step S42), the traveling control unit 22 may determine that the steering-wheel holding state is achieved, and the process may be caused to proceed to step S50. In a case where the steering torque value detected by the steering torque sensor 35 is confirmed as being less than the predetermined threshold (NO in step S42), the traveling control unit 22 may determine that the steering-wheel non-holding state is occurring, and the process may be caused to proceed to step S43.

In a case where the steering-wheel holding state is confirmed as being achieved in the process in step S41 or S42 described above and the process is caused to proceed to step S50, the traveling control unit 22 may reset the steering-wheel non-holding time period of the steering-wheel non-holding time period counter in step S50, and the process may be caused to return to step S41 described above.

In step S43, the traveling control unit 22 may cause the steering-wheel non-holding time period counter to count up the steering-wheel non-holding time period.

Thereafter, in step S44, the traveling control unit 22 may confirm whether the steering-wheel non-holding time period counted by the steering-wheel non-holding time period counter has exceeded a predetermined threshold (e.g., 15 seconds). In a case where the steering-wheel non-holding time period is confirmed as having exceeded the predetermined threshold (YES in step S44), the process may be caused to proceed to step S45. In a case where the steering-wheel non-holding time period has not exceeded the predetermined threshold (NO in step S44), the process may be caused to return to step S41.

In step S45, the traveling control unit 22 may drive the notification device 38 to perform a predetermined waring presentation. Non-limiting examples of the warning presentation to be performed here may include a visual presentation warning and an audio presentation warning that notify the driver that the steering-wheel non-holding state is continuing.

Thereafter, in step S46, the traveling control unit 22 may confirm again the output signal (the ON signal) from the steering-wheel touch sensor 34, as in the process in step S41 described above. In a case where the ON signal from the steering-wheel touch sensor 34 is confirmed (YES in step S46), the traveling control unit 22 may determine that the steering-wheel holding state is restored and the process may be caused to proceed to step SM. In a case where the ON signal from the steering-wheel touch sensor 34 is not confirmed (NO in step S46), the traveling control unit 22 may determine that the steering-wheel non-holding state is continuing, and the process may be caused to proceed to step S47.

In step S47, the traveling control unit 22 may confirm again whether the steering torque value detected by the steering torque sensor 35 is a predetermined threshold or greater, as in the process in step S42 described above. In a case where the steering torque value detected by the steering torque sensor 35 is confirmed as being the predetermined threshold or greater (YES in step S47), the traveling control unit 22 may determine that the steering-wheel holding state is restored, and the process may be caused to proceed to step S51. In a case where the steering torque value detected by the steering torque sensor 35 is confirmed as being less than the predetermined threshold (NO in step S47), the traveling control unit 22 may determine that the steering-wheel non-holding state is continuing, and the process may be caused to proceed to step S48.

In a case where the steering-wheel holding state is confirmed as being restored in the process in step S46 or S47 described above and the process is caused to proceed to step S51, the traveling control unit 22 may cancel, in step S51, the warning presentation that is continuing.

Thereafter, in step S52, the traveling control unit 22 may reset the steering-wheel non-holding time period of the steering-wheel non-holding time period counter, and the process may be caused to return to step S41 described above.

In step S48, the traveling control unit 22 may confirm whether a predetermined time period (e.g., 50 seconds) has elapsed from the timing of starting the warning presentation in the process in step S45 described above while the steering-wheel non-holding state is maintained and the warning presentation is continuing. In a case where the elapse of the predetermined time period is confirmed (YES in step S48), the traveling control unit 22 may cancel the steering assist control that is currently being executed, and the process may be caused to proceed to step S49. In a case where the predetermined time period has not elapsed yet (NO in step S48), the process may be caused to return to step S45.

In step S49, the traveling control unit 22 may execute the control for driver abnormality (see FIG. 11 for details).

Note that the processes in steps S44 to S48 in FIG. 10 have been described in a simplified manner. In a non-limiting example, the processes in steps S44 to S48 may be as follows.

(1) When the steering-wheel non-holding time period exceeds a predetermined threshold (e.g., 15 seconds), the traveling control unit 22 may start a visual warning presentation.

(2) If a predetermined time period (e.g., 15 seconds) further elapses with the state described in (1) being continuing (i.e., with the steering-wheel non-holding state being continuing and the visual warning presentation being also continuing) and without confirmation of a cancel operation performed by the driver or the like, the traveling control unit 22 may start an audio warning presentation, such as outputting a warning sound, in addition to the visual warning presentation that is continuing. Non-limiting examples of the cancel operation to be performed by the driver may include an operation of holding the steering wheel and an operation of pressing the accelerator pedal.

(3) If a predetermined time period (e.g., 30 seconds) further elapses with the state described in (2) being continuing (i.e., with the steering-wheel non-holding state being continuing and both the visual warning presentation and the audio warning presentation being also continuing) and without the confirmation of the cancel operation performed by the driver or the like, the traveling control unit 22 may output a warning with a stronger emergency signal for a predetermined time period (e.g., 5 seconds) or more.

(4) If the cancel operation performed by the driver or the like does not occur even in this state, the traveling control unit 22 may cancel the steering assist control which is currently executed.

The above-described process sequence is a mere example of a confirmation process to be performed upon starting the control for driver abnormality.

The process in step S48 in FIG. 10 that is to be thus started, i.e., a detailed sequence of the control for driver abnormality to be executed by the drive assist apparatus 1 is described below with reference to a sub-routine illustrated in FIG. 11.

First, in step S61 in FIG. 11, the traveling control unit 22 may perform a control of maintaining the traveling of the own vehicle 100 within the own-vehicle traveling lane on which the own vehicle 100 is traveling, and also perform the notification for the outside. For example, the traveling control unit 22 may first cause the hazard lamp to flash. Together therewith, the traveling control unit 22 may perform speed adjustment to cause the speed of the own vehicle 100 to be a predetermined upper limit (e.g., 50 km/h) or less. Non-limiting examples of the speed adjustment may include a deceleration control based on an engine control and a braking control. The deceleration control in this case may be a deceleration control without the suppression of acceleration, i.e., a braking control that accepts an input performed by means of an accelerator. The traveling control unit 22 may thus maintain the traveling of the own vehicle 100 within the same lane.

Thereafter, in step S62, the traveling control unit 22 may perform a first steering-wheel holding state determination process. The first steering-wheel holding state determination process may be performed by detecting an output from the steering-wheel touch sensor 34 or the steering torque sensor 35. In a case where the output signal (the ON signal) from the steering-wheel touch sensor 34 is detected or the steering torque value from the steering torque sensor 35 is determined as being the predetermined threshold or greater, and the first steering-wheel holding state determination therefore results in an ON state (YES in step S62), the traveling control unit 22 may cancel the execution of the control for driver abnormality and cause the process to return to the process that has been performed previously. In a case where the output signal (the ON signal) from the steering-wheel touch sensor 34 is not detected and the steering torque value from the steering torque sensor 35 is determined as being less than the predetermined threshold (NO in step S62), the process may be caused to proceed to step S63.

In step S63, the traveling control unit 22 may confirm whether a lane change is necessary to cause the currently-traveling own vehicle 100 to move toward the road shoulder side. For example, in a case where the own vehicle 100 is currently traveling on a right lane (i.e., a passing lane) of two lanes on one side of a four-lane road, it may be necessary to once perform a lane change to a left lane of the two lanes on the one side of the four-lane road to cause the own vehicle 100 to safely move toward the road shoulder side. In this case, the traveling control unit 22 may determine whether the lane change is necessary by recognizing, for example, a situation of a road on which the own vehicle 100 is traveling or a traveling environment at a position of the traveling lane on which the own vehicle 100 is traveling. Non-limiting examples of the situation of the road on which the own vehicle 100 is traveling may include the number of lanes of the road. Non-limiting examples of the position of the traveling lane on which the own vehicle 100 is traveling may include which lane of the plurality of lanes on one side of the road the own vehicle 100 is traveling.

In a case where the lane change is determined as being necessary (YES in step S63), the process may be caused to proceed to step S81. In a case where the lane change is determined as not being necessary (NO in step S63), the process may be caused to proceed to step S64.

In a case where the lane change is determined as being necessary in the process in step S63 described above and the process is caused to proceed to step S81, the traveling control unit 22 may execute, in step S81, a predetermined lane change control. This lane change control may be, for example, a lane change control of canceling the flashing of the hazard lamp which is currently executed, causing the left signal light to flash, and performing a steering control that causes the own vehicle 100 to move to the left lane, which is included in a normal automatic driving control. This lane change control may be performed on the basis of an existing known control, and a detail description thereof is therefore omitted.

Thereafter, in step S82, the traveling control unit 22 may confirm whether the lane change has been completed and whether the own vehicle 100 is traveling in a region of the lane which has been the target of the lane change. In a case where completion of the lane change is confirmed (YES in step S82), the process may be caused to proceed to step S83. In a case where the lane change has not been completed yet (NO in step S82), the process may be caused to return to step S81.

In a case where the completion of the lane change is confirmed, in step S83, the traveling control unit 22 may cancel the flashing of the left signal light, again cause the hazard lamp to flash, and continue the traveling control to maintain the traveling of the own vehicle 100 within the lane to which the own vehicle 100 has been moved. Thereafter, the process may be caused to return to step S62.

In contrast, in a case where the lane change is determined as being unnecessary in the above-described process in step S63 and the process is caused to proceed to step S64, the traveling control unit 22 may perform, in step S64, a braking control to cause the own vehicle 100 to decelerate to a predetermined speed (e.g., 10 km/h). The predetermined speed may be a lower speed that allows the own vehicle 100 to safely move to the road shoulder side. The deceleration control in this case may be a deceleration control with suppression of acceleration, i.e., a braking control that does not accept the input performed by means of an accelerator.

Thereafter, in step S65, the traveling control unit 22 may perform a living-state determination process to confirm whether a result of the living-state determination is in an ON state. The living-state determination process to be performed here may be a process of confirming whether some kind of operation that can be the basis of the determination of the living state of the driver has been performed by the driver or the passenger. Non-limiting examples of the operation that can be the basis of the determination of the living state of the driver may include an operation performed on an operation member such as a switch or a dial related to devices provided in the own vehicle 100 or a plurality of times of slight pressing operation performed on a brake pedal or an accelerator pedal. Non-limiting examples of the switch or the dial related to the devices provided in the own vehicle 100 may include an air conditioner switch, a window opening and closing switch, a mirror driving switch, and various switches provided on the steering wheel. Note that the living-state determination process according to the example embodiment may not be performed only on the basis of the detection of the output from the steering-wheel touch sensor 34.

In a case where the result of the living-state determination process is confirmed as being in the ON state (YES in step S65), the process may be caused to return to step S61 described above, in which the traveling control unit 22 may perform a control of maintaining the traveling of the own vehicle 100 within the own-vehicle traveling lane and also perform the speed control without the suppression of acceleration. In a case where the result of the living-state determination process is configured as not being in the ON state, i.e., in a case where no operation is confirmed (NO in step S65), the process may be caused to proceed to step S66.

In step S66, the traveling control unit 22 may perform a second steering-wheel holding state determination process. The second steering-wheel holding state determination process may be performed only on the basis of the detection of the output from the steering torque sensor 35 and without taking into consideration the detection of the output from the steering-wheel touch sensor 34. The detection of the output from the steering torque sensor 35 may be determination as to whether the steering torque value is a predetermined threshold or greater. In a case where the steering torque value from the steering torque sensor 35 is confirmed as being the predetermined threshold or greater and the second steering-wheel holding state determination results in the ON state (YES in step S66), the traveling control unit 22 may cancel the execution of the control for driver abnormality and the process may be caused to return to the process that has been performed previously. In a case where the steering torque value from the steering torque sensor 35 is confirmed as being less than the predetermined threshold (NO in step S66), the process may be caused to proceed to step S67.

In step S67, the traveling control unit 22 may confirm whether the own vehicle 100 has decelerated to the predetermined speed (e.g., 10 km/h) by the deceleration control executed in the process in step S64 described above. In a case where the own vehicle 100 is confirmed as having decelerated to the predetermined speed (YES in step S67), the process may be caused to proceed to step S68. In a case where the own vehicle 100 is confirmed as not having decelerated to the predetermined speed yet (NO in step S67), the process may be caused to return to step S64 described above.

In step S68, the traveling control unit 22 may perform a traveling control of causing the own vehicle 100 to move to the road shoulder side and retreat to a location within the region of the roadside strip. The traveling control to be performed in this case may be substantially similar to the lane change control described above. For example, the traveling control unit 22 may cancel the flashing of the hazard lamp which is currently being executed, cause the left signal light to flash, and perform a control such as a steering control that causes the own vehicle 100 to move to the region of the roadside strip.

Thereafter, in step S69, the traveling control unit 22 may confirm whether the own vehicle 100 has retreated to the location within the region of the roadside strip. In a case where the own vehicle 100 is confirmed as having retreated to the location within the region of the roadside strip (YES in step S69), the process may be caused to proceed to step S70. In a case where the own vehicle 100 is not confirmed as having retreated to the location within the region of the roadside strip (NO in step S69), the process may be caused to return to step S68.

In step S70, the traveling control unit 22 may cancel the flashing of the left signal light, and again cause the hazard lamp to flash.

Thereafter, in step S71, the traveling control unit 22 may perform a braking control to stop the own vehicle 100 while maintaining the traveling of the own vehicle 100 in the region of the roadside strip. This braking control may also be a deceleration control with the suppression of acceleration.

Thereafter, in step S72, the traveling control unit 22 may confirm whether the own vehicle 100 has stopped. In a case where the stopped state of the own vehicle 100 is confirmed (YES in step S72), the process may be caused to proceed to step S73. In a case where the stopped state of the own vehicle 100 is not confirmed (NO in step S72), the process may be caused to return to step S71.

In step S73, the traveling control unit 22 may confirm whether an operation for canceling the control for driver abnormality has been performed. In this step, the traveling control unit 22 may repeatedly confirm whether the operation for canceling the control for driver abnormality has been performed. In a case where the operation for canceling the control for driver abnormality is confirmed (YES in step S73), the traveling control unit 22 may end the series of processes, and the process may be caused to return to the process that has been performed previously.

For example, it may be assumed that the operation for canceling the control for driver abnormality to be performed in the process in step S73 described above is a predetermined operation to be performed by the driver or the passenger. Non-limiting examples of a case where the driver performs the operation for canceling the control for driver abnormality may include a case where the control for driver abnormality has been performed as a result of lowered consciousness of the driver but the driver recovers to a conscious state after the own vehicle 100 has stopped. Note that even if the own vehicle 100 has safely stopped in the region of the roadside strip N, the drive assist apparatus 1 according to the example embodiment may not perform the process of canceling the control for driver abnormality immediately after the stopping of the own vehicle 100. Instead, the drive assist apparatus 1 may wait for the input of the predetermined cancel operation to be performed in step S73, and if the predetermined cancel operation is performed, the drive assist apparatus 1 may cancel the control for driver abnormality. In this case, the person to perform the cancel operation can be the driver or the passenger. However, it may still be difficult for the driver to perform the operation even after the stopping of the own vehicle 100. Further, the passenger may not be used to the operation related to driving of the own vehicle 100. In such a case, the control for driver abnormality may be continued even after a state that the own vehicle 100 is stopped in a safe region on the road is secured as described above.

For example, it is assumable that a person such as an outside rescuer opens the door of the own vehicle 100 which is in a stopped state. In such a case, it is assumable that it is still difficult for the driver inside the own vehicle 100 to perform driving, although the own vehicle 100 is in the stopped state. The driver in such a state may possibly perform a behavior conforming to the driving operation. For example, the driver in such a state may touch the steering wheel or press the accelerator pedal still in the unconscious state or without being aware of. This may lead to occurrence of an unintentional vehicle behavior. Accordingly, in order to suppress such an unintentional behavior, the drive assist apparatus 1 may be configured to require a cancel operation clearly performed by a person such as the rescuer in order to cancel the control for driver abnormality, or the drive assist apparatus 1 may be configured to additionally perform operation of stopping operation related to the traveling control of the own vehicle 100 after the stopping of the own vehicle 100.

Further, in the example embodiment described above, the determination of the steering-wheel holding state may be performed on the basis of whether the steering-wheel non-holding state has continued for a predetermined time period.

However, this example is non-limiting. In another example, the drive assist apparatus may be configured to recognize whether the own vehicle has traveled a predetermined distance in the steering-wheel non-holding state, and use the recognized distance traveled by the own vehicle as the basis of the determination of the steering-wheel holding state.

As described above, according to the example embodiment, the traveling control unit 22 may execute the traveling control for emergency, i.e., the control for driver abnormality in a case where the result of the determination performed by the surrounding situation determination processor 22*a* or the steering-wheel holding state determination processor 22*b* indicates that the driver of the own vehicle 100 is unable to maintain normal traveling.

In a case where the control for driver abnormality is executed, if the result of the determination performed by the steering-wheel holding state determination processor 22*b* indicates that the driver of the own vehicle 100 is unable to maintain the normal traveling, the traveling control unit 22 may stop the traveling assist control which is currently performed by the own vehicle 100. After stopping the traveling assist control, the traveling control unit 22 may perform the first steering-wheel holding state determination process of detecting the output of the steering-wheel touch sensor 34 or the steering torque sensor 35 of the steering-wheel state recognizer. In a case where the output of the steering-wheel touch sensor 34 or the steering torque sensor 35 is detected, the traveling control unit 22 may resume the traveling assist control. In a case where the output of neither the steering-wheel touch sensor 34 nor the steering torque sensor 35 is detected, the traveling control unit 22 may perform the second steering-wheel holding state determination process of detecting only the output value from the steering torque sensor 35 of the steering-wheel state recognizer. The traveling control unit 22 may thereby detect the output value from the steering torque sensor 35, and may resume the traveling assist control only in a case where the output value of the steering torque sensor 35 exceeds a predetermined threshold.

In the drive assist apparatus 1 according to the example embodiment having the above-described configuration, during the execution of the control for driver abnormality, first, determination of the steering-wheel holding state may be performed by the first steering-wheel holding state determination process. If it is determined, as a result, that the steering-wheel non-holding state continues for a predetermined time period or while the own vehicle 100 travels a predetermined distance, determination of the steering-wheel holding state may be performed by the second steering-wheel holding state determination process which does not take into consideration the detection of the output from the steering-wheel touch sensor 34 of the steering-wheel holding state recognizer.

Accordingly, the drive assist apparatus 1 of the example embodiment is thereby able to reduce false detection related to the determination of the abnormal state of the driver, and is able to perform more reliable and highly accurate control for driver abnormality. Accordingly, the drive assist apparatus 1 according to the example embodiment is able to contribute to improvement in safety of traveling of a vehicle.

The example embodiment has been described referring to a case where the own vehicle 100 is eventually guided to a location in the region of the roadside strip and stopped there as an example of the control for driver abnormality; however, this is a mere example and non-limiting. In another example, instead of performing the steering control for the lane change or the like, the own vehicle 100 may be gradually decelerated and stopped in the same lane on which the own vehicle 100 has been traveling while the notification for the outside such as flashing of the hazard lamp is performed. Thereafter, for example, the notification for the outside such as blaring of the horn may be performed in addition to the flashing of the hazard lamp.

The technology is not limited to the foregoing example embodiments. Needless to say, various modifications and applications may be made without departing from the gist of the technology. Further, the foregoing example embodiments each include various stages of the technology, and various technologies may be extracted by appropriately combining the features of the technology disclosed herein. For example, in a case where the above-described concerns to be solved by the embodiment of the technology may be addressed and the above-described effects of the embodiment of the technology may be obtained even if some features are deleted from all the features described in the foregoing example embodiments, the remaining features may be extracted as a technology. Further, the features in different example embodiments may be appropriately combined. The technology is not limited by any particular embodiment besides the appended claims.

According to an embodiment of the technology, it is possible to provide a driving assist apparatus, to be mounted on a vehicle such as an automobile, that is able to execute a more natural and smoother steering assist control without giving a sense of annoyance or strangeness to a driver even with a combination of a plurality of kinds of steering assist controls.

In addition, it is also possible to provide a driving assist apparatus that reduces false determination in a steering-wheel holding state determination during execution of a steering wheel assist control while an own vehicle is traveling or in living-state determination during execution of the control for driver abnormality and thereby performs reliable determination with higher accuracy, thereby being able to perform a traveling assist control including a steering assist control and a control for driver abnormality that are more reliable, smoother, and highly safe.

Each of the map locator processor 12, the own vehicle position estimator 12a, the map information acquisition section 12b, the surrounding environment recognizer 20b, the IPU 21c, the traveling environment recognizer 21d, the traveling control unit 22, the surrounding situation determination processor 22a, the steering-wheel holding state determination processor 22b, the traveling lane setting processor 22c, the steering assist control processor 22d, the target traveling position setting section 22e, the avoidance determination section 22f, the lane departure determination section 22g, the engine control unit 23, the power steering control unit 24, and the brake control unit 25 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the map locator processor 12, the own vehicle position estimator 12a, the map information acquisition section 12b, the surrounding environment recognizer 20b, the IPU 21c, the traveling environment recognizer 21d, the traveling control unit 22, the surrounding situation determination processor 22a, the steering-wheel holding state determination processor 22b, the traveling lane setting processor 22c, the steering assist control processor 22d, the target traveling position setting section 22e, the avoidance determination section 22f, the lane departure determination section 22g, the engine control unit 23, the power steering control unit 24, and the brake control unit 25 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the map locator processor 12, the own vehicle position estimator 12a, the map information acquisition section 12b, the surrounding environment recognizer 20b, the IPU 21c, the traveling environment recognizer 21d, the traveling control unit 22, the surrounding situation determination processor 22a, the steering-wheel holding state determination processor 22b, the traveling lane setting processor 22c, the steering assist control processor 22d, the target traveling position setting section 22e, the avoidance determination section 22f, the lane departure determination section 22g, the engine control unit 23, the power steering control unit 24, and the brake control unit 25 illustrated in FIG. 1.

The invention claimed is:

1. A drive assist apparatus to be applied to a vehicle, the drive assist apparatus comprising:
   a surrounding situation recognition device configured to recognize a surrounding situation of a first vehicle that is the vehicle to be applied with the drive assist apparatus;
   a surrounding situation determination processor configured to determine the surrounding situation of the first vehicle on a basis of a result of recognition performed by the surrounding situation recognition device;
   a steering-wheel holding state recognizer configured to recognize a steering-wheel holding state that is a state in which a driver who drives the first vehicle is holding a steering wheel of the first vehicle;
   a steering-wheel holding state determination processor configured to determine the steering-wheel holding state on a basis of a result of recognition performed by the steering-wheel holding state recognizer; and
   a traveling control device configured to perform a traveling control of the first vehicle on a basis of a result of determination performed by the surrounding situation determination processor or the steering-wheel holding state determination processor,
   the traveling control device being configured to execute a traveling control for emergency in a case where the result of the determination performed by the surrounding situation determination processor or the steering-wheel holding state determination processor indicates that the first vehicle or the driver of the first vehicle is unable to maintain normal traveling,
   wherein the traveling control device includes:
      a traveling lane setting processor configured to set a set traveling lane on which the first vehicle is to travel, on a basis of information of the surrounding situation of the first vehicle recognized by the surrounding situation recognition device; and
      a steering assist control processor including
         a target traveling position setting section configured to set a target traveling position at which the first vehicle is to travel within the set traveling lane set by the traveling lane setting processor, and
         a lane departure determination section configured to determine, when the first vehicle is traveling on the set traveling lane, whether the first vehicle is to depart from the set traveling lane,
      wherein the steering assist control processor is configured to selectively execute each of:
         a lane departure prevention control including a steering assist control to be executed in a case where the first vehicle is determined, by the lane departure determination section, as being to depart from the set traveling lane; and
         an emergency lane keeping control including a steering assist control to be executed in a case where a second vehicle is recognized by the surrounding situation recognition device and where the first vehicle is determined, by the lane departure determination section, as being to depart from the set traveling lane, the second vehicle being a vehicle opposing the first vehicle or traveling in a rear-side region of the first vehicle in a direction same as a traveling direction of the first vehicle, and
      wherein the steering assist control processor is configured to:
         in a case where both the lane departure prevention control and the emergency lane keeping control are in an activated state, perform switching from the emergency lane keeping control to the lane departure prevention control at a timing when the second vehicle becomes no longer detected in a period in which the first vehicle is caused to travel along a lane line of the set traveling lane without crossing the lane line, and execute a first emergency lane keeping control, the first emergency lane keeping control being a control of performing a traveling control that causes a traveling position of the first vehicle to return from a position at which the first vehicle is prevented from crossing the lane line of the set traveling lane to the target traveling position; and
         in a case where the lane departure prevention control is in a non-activated state and the emergency lane keeping control is in the activated state, execute a second emergency lane keeping control of ending the emergency lane keeping control, at a timing when the second vehicle becomes no longer detected in a period in which the first vehicle is caused to travel along the lane line of the set traveling lane without crossing the lane line and is thereafter caused to travel along a lane end within the set traveling lane.

2. A drive assist apparatus to be applied to a vehicle, the drive assist apparatus comprising:
   a surrounding situation recognition device configured to recognize a surrounding situation of a first vehicle that is the vehicle to be applied with the drive assist apparatus;
   a surrounding situation determination processor configured to determine the surrounding situation of the first vehicle on a basis of a result of recognition performed by the surrounding situation recognition device;
   a steering-wheel holding state recognizer configured to recognize a steering-wheel holding state that is a state in which a driver who drives the first vehicle is holding a steering wheel of the first vehicle;
   a steering-wheel holding state determination processor configured to determine the steering-wheel holding state on a basis of a result of recognition performed by the steering-wheel holding state recognizer; and
   a traveling control device configured to perform a traveling control of the first vehicle on a basis of a result of determination performed by the surrounding situation determination processor or the steering-wheel holding state determination processor,
   the traveling control device being configured to execute a traveling control for emergency in a case where the result of the determination performed by the surrounding situation determination processor or the steering-wheel holding state determination processor indicates that the first vehicle or the driver of the first vehicle is unable to maintain normal traveling,
   wherein the steering-wheel holding state recognizer includes a steering torque sensor and a steering-wheel touch sensor, the steering torque sensor being provided on a steering shaft, the steering-wheel touch sensor provided on the steering wheel,
   wherein the steering-wheel holding state determination processor is configured to determine that the driver of the first vehicle is unable to maintain the normal traveling, in a case where a steering device receives no interference from the driver of the first vehicle in a period in which a predetermined time elapses or in which the first vehicle travels a predetermined distance, and where the steering-wheel holding state recognizer detects no steering-wheel holding state, and wherein the traveling control device is configured to:
in a case where the result of the determination performed by the steering-wheel holding state determination processor indicates that the driver of the first vehicle is unable to maintain the normal traveling, stop a traveling assist control being currently executed by the first vehicle, and perform a first steering-wheel holding state determination process after stopping the traveling assist control, the first steering-wheel holding state determination process being a process of detecting an output from the steering-wheel touch sensor or the steering torque sensor of the steering-wheel holding state recognizer;
in a case where the output from the steering-wheel touch sensor or the steering torque sensor is detected in the first steering-wheel holding state determination process, cause the traveling assist control to be resumed;
in a case where the output from the steering-wheel touch sensor or the steering torque sensor is not detected in the first steering-wheel holding state determination process, perform a second steering-wheel holding state determination process after an elapse of a predetermined time or after the first vehicle travels a predetermined distance, the second steering-wheel holding state determination process being a process of detecting only the output from the steering torque sensor of the steering-wheel holding state recognizer; and
in a case where the output from the steering torque sensor is detected and where a value of the output from the steering torque sensor exceeds a predetermined threshold in the second steering-wheel holding state determination process, cause the traveling assist control to be resumed.

3. A drive assist apparatus to be applied to a vehicle, the drive assist apparatus comprising:
a surrounding situation sensor configured to recognize a surrounding situation of a first vehicle that is the vehicle to be applied with the drive assist apparatus;
a steering-wheel holding state sensor configured to recognize a steering-wheel holding state that is a state in which a driver who drives the first vehicle is holding a steering wheel of the first vehicle; and
circuitry configured to
determine the surrounding situation of the first vehicle on a basis of a result of recognition performed by the surrounding situation sensor,
determine the steering-wheel holding state on a basis of a result of recognition performed by the steering-wheel holding state sensor, and
perform a traveling control of the first vehicle on a basis of a result of determination of the surrounding situation or a result of determination of the steering-wheel holding state, the circuitry being configured to execute a traveling control for emergency in a case where the result of the determination of the surrounding situation or the result of the determination of the steering-wheel holding state indicates that the first vehicle or the driver of the first vehicle is unable to maintain normal traveling, wherein the circuitry is further configured to:
set a set traveling lane on which the first vehicle is to travel, on a basis of information of the surrounding situation of the first vehicle,
set a target traveling position at which the first vehicle is to travel within the set traveling lane set by the traveling lane setting processor,
determine, when the first vehicle is traveling on the set traveling lane, whether the first vehicle is to depart from the set traveling lane,
selectively execute each of:
a lane departure prevention control including a steering assist control to be executed in a case where the first vehicle is determined as being to depart from the set traveling lane; and
an emergency lane keeping control including a steering assist control to be executed in a case where a second vehicle is recognized and where the first vehicle is determined as being to depart from the set traveling lane, the second vehicle being a vehicle opposing the first vehicle or traveling in a rear-side region of the first vehicle in a direction same as a traveling direction of the first vehicle,
in a case where both the lane departure prevention control and the emergency lane keeping control are in an activated state, perform switching from the emergency lane keeping control to the lane departure prevention control at a timing when the second vehicle becomes no longer detected in a period in which the first vehicle is caused to travel along a lane line of the set traveling lane without crossing the lane line, and execute a first emergency lane keeping control, the first emergency lane keeping control being a control of performing a traveling control that causes a traveling position of the first vehicle to return from a position at which the first vehicle is prevented from crossing the lane line of the set traveling lane to the target traveling position, and
in a case where the lane departure prevention control is in a non-activated state and the emergency lane keeping control is in the activated state, execute a second emergency lane keeping control of ending the emergency lane keeping control, at a timing when the second vehicle becomes no longer detected in a period in which the first vehicle is caused to travel along the lane line of the set traveling lane without crossing the lane line and is thereafter caused to travel along a lane end within the set traveling lane.

* * * * *